US009418142B2

(12) United States Patent
Kumar

(10) Patent No.: US 9,418,142 B2
(45) Date of Patent: Aug. 16, 2016

(54) OVERLAPPING COMMUNITY DETECTION IN WEIGHTED GRAPHS

(71) Applicant: Google Inc., Mountain View, CA (US)

(72) Inventor: Shailesh Kumar, Hyderabad (IN)

(73) Assignee: Google Inc., Mountain View, CA (US)

( * ) Notice: Subject to any disclaimer, the term of this patent is extended or adjusted under 35 U.S.C. 154(b) by 236 days.

(21) Appl. No.: 14/286,297

(22) Filed: May 23, 2014

(65) Prior Publication Data

US 2014/0351267 A1 Nov. 27, 2014

Related U.S. Application Data

(60) Provisional application No. 61/827,513, filed on May 24, 2013.

(51) Int. Cl.
*G06F 17/00* (2006.01)
*G06F 17/30* (2006.01)
*G06K 9/62* (2006.01)

(52) U.S. Cl.
CPC ........ *G06F 17/30663* (2013.01); *G06K 9/6224* (2013.01)

(58) Field of Classification Search
CPC . G06F 3/011; G06F 3/04886; G06F 3/04842; G06F 3/04847; G06F 3/023; G06F 3/04817
See application file for complete search history.

(56) References Cited

U.S. PATENT DOCUMENTS

2010/0046842 A1 * 2/2010 Conwell ........... G06F 17/30265 382/218
2010/0083173 A1 * 4/2010 Germann ............ G06F 17/3012 715/810

OTHER PUBLICATIONS

Begelman G. et al, "Automated Tag Clustering: Improving Search and Exploration in the Tag Space," WWW '06 Proceedings of the 15th International Conference on World Wide Web, May 22, 2006-May 26, 2006, pp. 1-5.
Bouma G., "Normalized (pointwise) mutual information in collocation extraction," Proceedings of GSCL (German Society for Computational Linguistics), Sep. 30, 2009, pp. 1-11.
Choudhury, Smitashree et al., "Enrichment and Ranking of the YouTube Tag Space and Integration with the Linked Data Cloud," The Semantic Web, ISWC 2009, Oct. 25, 2009, pp. 747-762, Springer Berlin Heidelberg, Germany.
International Search Report and Written Opinion for PCT/US2014/039348 dated Oct. 22, 2014, 13 pages.
Lohmann, Steffen et al. "Representing and Visualizing Folksonomies as Graphs," Proceedings of the International Working Conference on Advanced Visual Interfaces, AVI '12, 2012, p. 729, New York.
(Continued)

*Primary Examiner* — Truong Vo
(74) *Attorney, Agent, or Firm* — Patent Law Works LLP

(57) ABSTRACT

The disclosure includes a system and method for detecting communities in a weighted graph. The community detection module includes a tagset data aggregator, a counts statistics engine, a weighted graph generator, a coherence engine, a community detector and a tag recommendation engine. The tagset data aggregator receives tagset data. The counts statistics engine determines counts statistics for the tagset data. The weighted graph generator generates and denoises weighted tag occurrence graph based on the counts statistics. The coherence engine determines importance score for all tags and coherence score for all tagsets in the tagset data. The community detector determines maximally coherent communities in the weighted tag co-occurrence graph. The tag recommendation engine recommends tags in real time using the maximally coherent communities.

17 Claims, 12 Drawing Sheets

(56) References Cited

OTHER PUBLICATIONS

Newman, David et al., "Evaluating Topic Models for Digital Libraries," Proceedings of the 10th Annual Joint Conference on Digital Libraries, JCDL '10, Jun. 21, 2010, pp. 215-224.

Sawant, Neela et al., "Automatic Image Semantic Interpretation Using Social Action and Tagging Data," Multimedia Tools and Applications, Nov. 11, 2010, pp. 213-246, vol. 51, No. 1, Kluwer Academic Publishers.

Specia, Lucia et al., "Integrating Folksonomies with the Semantic Web," The Semantic Web: Research and Applications; [Lecture Notes in Computer Science; LNCS], Jun. 3, 2007, pp. 624-639, Springer Berlin Heidelberg, Germany.

Zhang, Yanlong, "Automated Clustering in Collaborative Tagging Systems: Scopes and Methods," Master's Thesis in Science of the Internet, Jul. 21, 2011, pp. 41-55, 62.

* cited by examiner

OVERLAPPING COMMUNITY DETECTION IN WEIGHTED GRAPHS

RELATED APPLICATIONS

This application claims the benefit of U.S. Provisional Application No. 61/827,513, filed on May 24, 2013, which is herein incorporated in its entirety by reference.

BACKGROUND

The specification relates to detecting overlapping communities in weighted graphs.

Community detection is a well-studied paradigm and is used in a variety of domains, such as physics, biology, computer science, social networks analysis, etc. to find novel and useful collection of entities that go together. One way to form communities is by amassing entities such as tags or keywords in collaborative tagging systems, products in retail systems, people in social networking systems, or genes in biological systems.

There are two main problems in community detection. First, the data used to associate entities with other entities might be noisy as in some cases these associations might just be random while in other cases these might be significant. This degree of association between pairs of entities might be quantified by a weight between them. Therefore detecting communities in weighted graphs is a more important problem than in unweighted graphs. The second problem is that the communities themselves might be overlapping because an entity might be associated with more than one community. For example, a product like a wrist watch might go with both electronic products as well as jewelry products. Similarly, an ambiguous keyword like "bank" might mean a financial institution or a bank of a river. Therefore the community detection paradigm must deal with overlapping communities in weighted graphs.

Previous attempts to create graphs include generating an unweighted graph either directly or by thresholding a weighted graph, detecting communities, and then removing the noise from the communities. Thresholding, however, leads to a significant loss of information and makes the final communities detected very sensitive to the threshold used to convert the weighted graph into unweighted graph. In addition, removing the noise from the communities after they have been detected results in poorly defined communities because important tags may get improperly removed.

SUMMARY

According to one innovative aspect of the subject matter described in this disclosure, a system includes a processor and a memory storing instructions that, when executed, cause the system to: identify a context defining a tagset, determine a plurality of tagsets each including one or more of the tags and a vocabulary of all tags, generate counts statistics using the plurality of tagsets and the vocabulary of all tags, generate a weighted co-occurrence graph including each pair of tags in the vocabulary of all tags based on the counts statistics, denoise the weighted tag co-occurrence graph, and responsive to removing the noise, identify at least one community in the weighted tag co-occurrence graph.

In general, another innovative aspect of the subject matter described in this disclosure may be embodied in methods that include: identifying a context defining a tagset, determining a plurality of tagsets each including one or more of the tags and a vocabulary of all tags, generating counts statistics using the plurality of tagsets and the vocabulary of all tags, generating a weighted co-occurrence graph including each pair of tags in the vocabulary of all tags based on the counts statistics; denoising the weighted tag co-occurrence graph, and responsive to removing the noise, identifying at least one community in the weighted tag co-occurrence graph of overlapping communities.

Other implementations of one or more of these aspects include corresponding systems, apparatus, and computer programs, configured to perform the actions of the methods, encoded on computer storage devices.

These and other implementations may each optionally include one or more of the following features. For instance, the operation further includes: determining a measure of co-occurrence consistency for each pair of tags in the vocabulary of all tags based on the counts statistics, the measure of co-occurrence consistency measuring how much more is a likelihood of each pair of tags co-occurring in a tagset from the plurality of tagsets relative to random, determining whether a measure of co-occurrence consistency for a pair of tags in the weighted tag co-occurrence graph is below a threshold, responsive to determining that the measure of co-occurrence consistency is below a threshold, removing an edge connecting the pair of tags from the weighted tag co-occurrence graph as noise, determining whether a measure of co-occurrence consistency for a pair of tags in the weighted tag co-occurrence graph is above a threshold, responsive to determining that the measure of co-occurrence consistency is above a threshold, re-computing counts statistics and updating the measure of co-occurrence consistency for the pair of tags in the weighted tag co-occurrence graph based on the recomputed counts statistics. In another embodiment, the operation further includes: determining an importance score of the one or more tags in each of the plurality of tagsets using the weighted tag co-occurrence graph, the importance score indicating how highly each tag is connected to other tags in each of the plurality of tagsets, determining coherence of each of the plurality of tagsets based on the importance score of the one or more tags, the coherence being a measure of community-ness and expressed as the aggregate of the importance score of the one or more tags in each of the plurality of tagsets, identifying the one or more communities from the weighted tag co-occurrence graph by comparing the coherence between each of the plurality of tagsets, determining a pair of tags with a measure of co-occurrence consistency above a threshold as seed, identifying the seed as a current tagset, determining the coherence of the current tagset, adding a first tag that has a co-occurrence consistency measured with all tags of the current tagset as being above the threshold to create a grow tagset, removing a second tag having a least importance score from the current tagset to create a shrink tagset, comparing a coherence measured for the grow tagset with a coherence measured for the shrink tagset, responsive to the coherence measured for the grow tagset being greater than the coherence measured for the shrink tagset, identifying the grow tagset as a next tagset and adding a third tag that has a co-occurrence consistency measured with remaining tags of the next tagset as being above the threshold, responsive to the coherence measured for the grow tagset being lesser than the coherence measured for the shrink tagset, identifying the shrink tagset as a next tagset and removing a fourth tag having a least importance score from the next tagset, comparing the coherence measured for the next tagset with the coherence of the current tagset, responsive to the coherence measured for the current tagset being greater than the coherence measured for the next tagset, determining the current tagset as being a community; responsive to the coherence measured for the current tagset being lesser than the coherence measured for the next tagset, adding a next tag that has a co-occurrence consistency measured with all tags of the current tagset as being above the threshold to create a next grow tagset and removing a next tag having a least importance score from the current tagset to create a next shrink tagset, creating a largest candidate seed by adding a next tag to the seed to increase coherence until failure, and identifying the largest candidate seed as the current tagset. Once the community has been created, in one embodiment, the operations further comprise recommending tags in real time based on the at least one community in the weighted tag co-occurrence graph.

The technology may be particularly advantageous in a number of respects. First, the system provides algorithms to aggressively remove noise at the weighted graph generation and to greedily detect maximally coherent communities in the weighted graph. In addition, because the community detection is performed on a weighted graph, the detected communities are overlapping, strong and tightly bound.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

System Overview

A system and method for detecting communities in a weighted graph that is generated from aggregated tagset data is described below.

Figure 1:
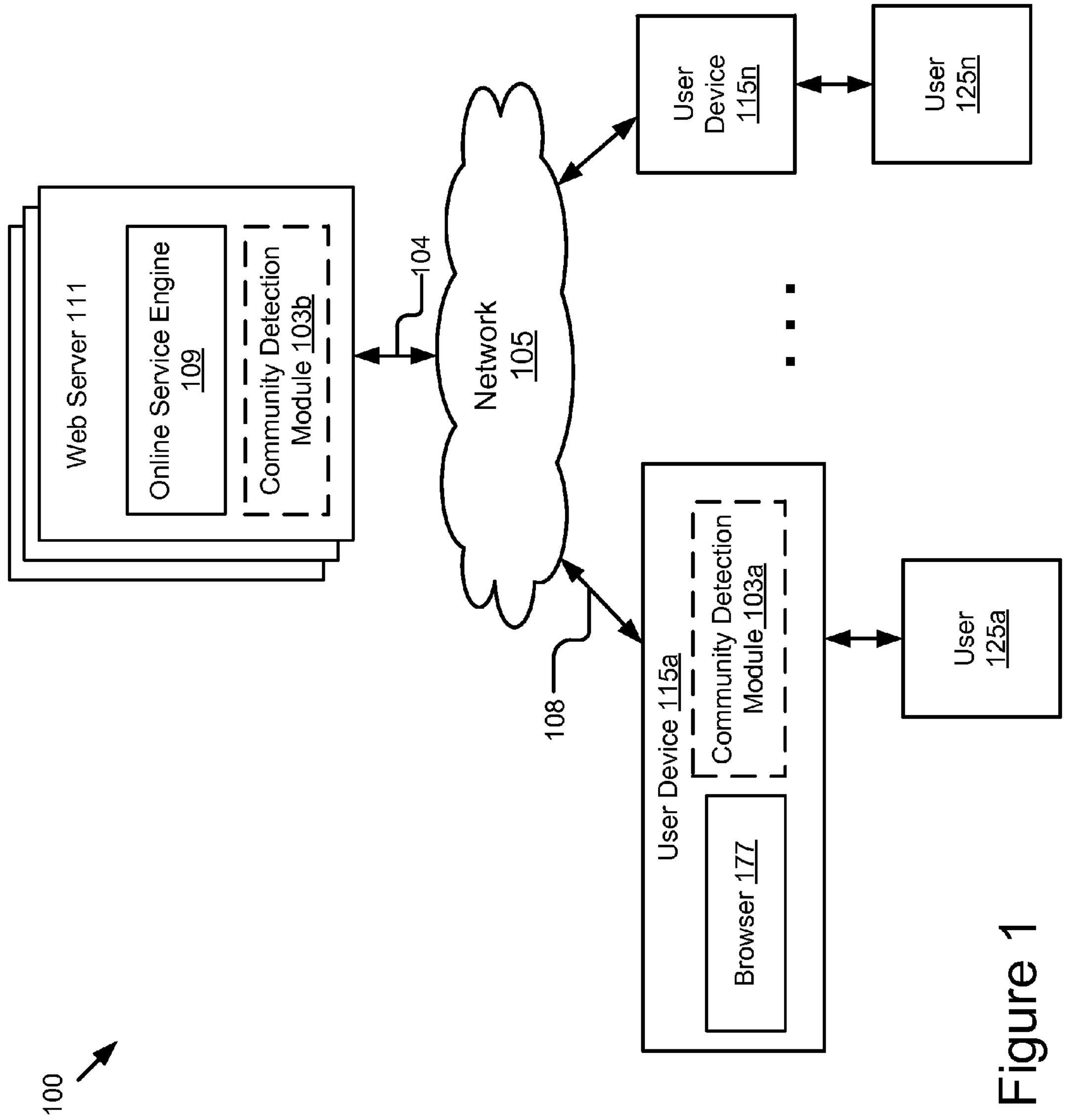
FIG. 1 is a block diagram illustrating an example system for detecting communities in a weighted graph.

FIG. 1 illustrates a block diagram of a system 100 for detecting communities in a weighted graph according to some implementations. The illustrated description of the example system 100 includes user devices 115*a* . . . 115*n* that can be accessed by users 125*a* . . . 125*n* and a web server 111. In the illustrated implementation, these entities of the system 100 are communicatively coupled via a network 105. In FIG. 1 and the remaining figures, a letter after a reference number, for example "115*a*" can be a reference to the element having that particular reference number. A reference number in the text without a following letter, for example "115," can be a general reference to the embodiments of the element bearing that reference number.

The network 105 can be a conventional type, wired or wireless, and may have a number of configurations, for example, a star configuration, a token ring configuration or other configurations. Furthermore, the network 105 may include one or more of a local area network (LAN), a wide area network (WAN) (e.g., the Internet), and other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 includes BLUETOOTH® communication networks or a cellular communications network for sending and receiving data, for example, via short messaging service (SMS), multimedia messaging service (MMS), hypertext transfer protocol (HTTP), direct data connection, WAP, electronic message, etc. While only one network 105 is illustrated, any number of networks may be coupled to the above mentioned entities.

The user devices 115*a* . . . 115*n* in FIG. 1 are used by way of example. Although only two devices are illustrated, the technology applies to a system architecture having one or more user devices 115. In some embodiments, the community detection module 103*a* can be stored on a user device 115*a*, which is connected to the network 105 via signal line 108. The community detection module 103*a* can be a thin-client application that includes part of the community detection module 103 on the user device 115*a* and part of the community detection module 103 on the web server 111 to detect one or more communities. The user device 115 can be any computing device that includes a memory and a processor. For example, the user device 115 can be a laptop computer, a desktop computer, a tablet computer, a mobile telephone, a personal digital assistant, a mobile email device, a portable game player, a portable music player, a television with one or more processors embedded therein or coupled thereto or any other electronic device capable of accessing the network 105, etc.

In some embodiments, the user device 115*a* includes a browser 177. The browser 177 can be software including routines stored in the memory and executed by the processor of the user device 115. The browser 177 includes any browser application that can retrieve pages hosted by a server (for example, the web server 111, a social network server (not shown), a third-party server (not shown), etc.) and can present the pages on a display (not shown) on the user device 115*a*. In some embodiments, the browser 177 retrieves and presents the pages hosted by the user device 115. The term page includes any document or information resource that comprises textual elements, non-textual elements (for example, static images, animated images, audio, video, etc.), interactive elements (for example, games, buttons, hyperlinks, etc.), scripts (for example, JavaScript, code implementing Ajax techniques, etc.), metadata, etc. In some embodiments, the page is a web page in any file format (for example, HTML, HTML5, XHTML, XML, etc.).

In some embodiments, the community detection module 103*b* can be operable on the web server 111, which is coupled to the network 105 via signal line 104. The web server 111 can be any computing device such as a hardware server including a processor, a memory and network communication capabilities. The web server 111 includes software instructions and/or data for generating online services and providing content from the online services to a user who has a subscription with the online services. For example, the web server 111 transmits content such as video, audio, images, publication entries, etc. from an online service. In some embodiments, the content transmitted includes keywords or terms assigned to content by users of the online service. An application such as a browser 177 launched on a user device 115 receives the content transmitted by the web server 111 via the network 105. Other examples of a web server 111 include an online service for users to provide reviews and commercial websites for purchasing products.

The web server 111 comprises an online service engine 109 that can be software including routines that, when executed by a processor (not pictured), generates an online service that is hosted by the web server 111. The online service engine 109 can be stored on a non-transitory memory associated with the web server 111. The online service engine 109 is dedicated to generating and providing content for users. The online service engine 109 sends and receives data to and from other entities of the system 100 via the network 105. For example, the online service engine 109 generates a video sharing online service that plays a video responsive to receiving a user request from the user device 115. In another example, the online service is an image hosting service that returns one or more images in response to receiving an application programming interface (API) call. In some embodiments, the online service engine 109 receives data including keywords/terms describing the content from users of the online service. For example, the online service can be a social bookmarking service that hosts and displays publication entries annotated by users with tags. In another example, the online service can be an online database that provides information related to movies, television programs and video games including user reviews and tags annotated by experts. Other examples of online services that provide access to content include current news, financial news, search service, maps, price aggregator service, weather service, airline reservations, file archives, electronic mail, blogs, micro-blogs, social networks, calendars, geolocation service, etc.

In some embodiments, the browser 117 accesses the online service using hypertext transfer protocol (HTTP) requests and retrieves content for one or more web pages generated from the online service engine 109.

The community detection module 103 can be software including routines for detecting communities in a weighted graph. In some embodiments, the community detection module 103 can be implemented using hardware including a field-programmable gate array (FPGA) or an application-specific integrated circuit (ASIC). In some other embodiments, the community detection module 103 can be implemented using a combination of hardware and software. In some embodiments, the community detection module 103 may be stored in a combination of the devices and servers, or in one of the devices or servers.

In some embodiments, community detection module 103 receives tagset data including a plurality of tagsets and identifies a context defining a tagset. The community detection module 103 generates counts statistics using the plurality of tagsets. The community detection module 103 generates a weighted tag co-occurrence graph based on the counts statistics and denoises the weighted tag co-occurrence graph. The community detection module 103 determines importance scores for all tags in the tagset data. The community detection module 103 determines coherence scores for all tagsets in the tagset data. The community detection module 103 determines maximally coherent communities in the weighted tag co-occurrence graph and recommends tags in real time using the maximally coherent communities. The community detection module 103 is described below in more detail with reference to FIG. 2.

Example Community Detection Module 103

Figure 2:
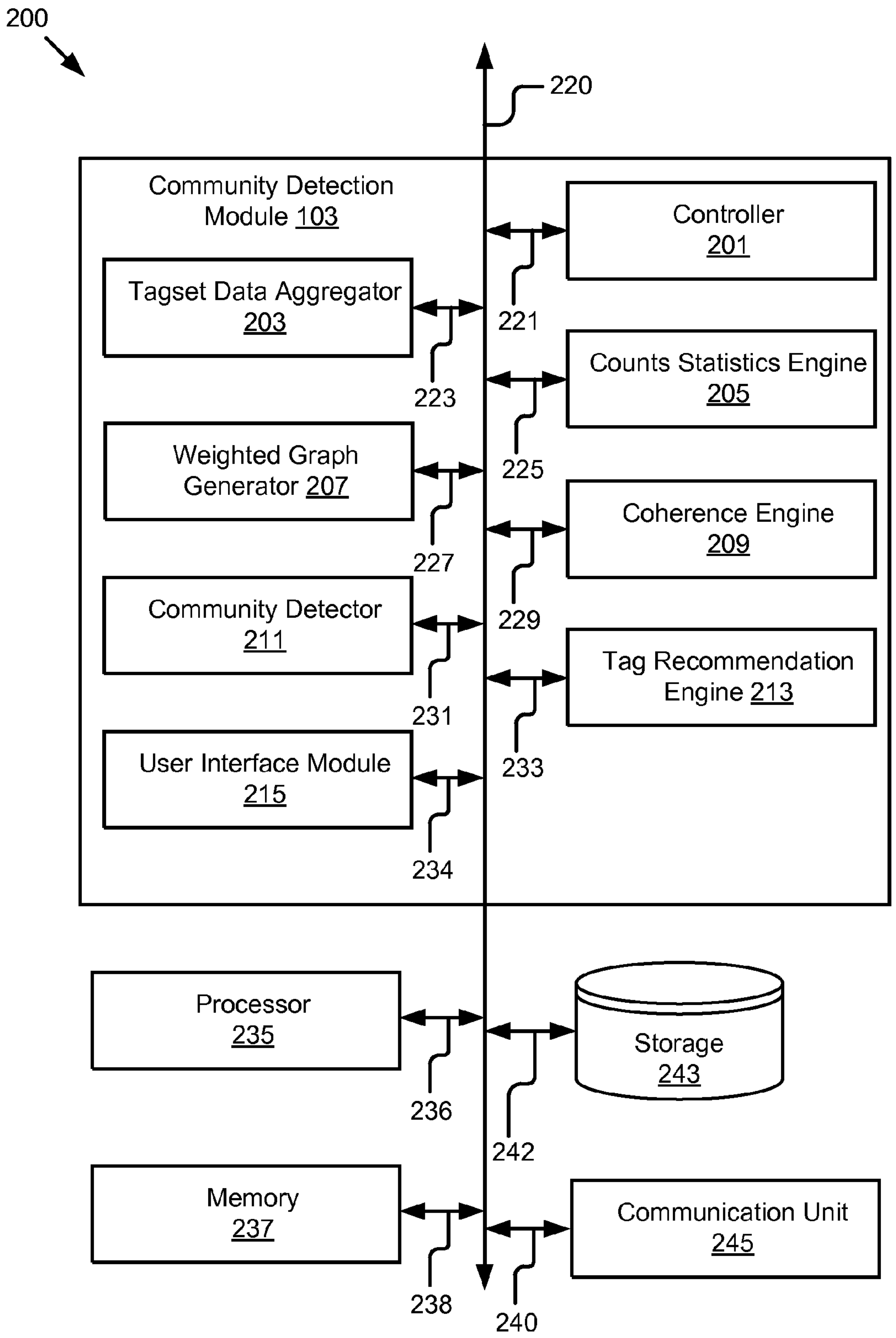
FIG. 2 is a block diagram illustrating an example community detection module.

Referring now to FIG. 2, an example of the community detection module 103 is shown in detail. FIG. 2 is a block diagram of a computing device 200 that includes the community detection module 103, a processor 235, a memory 237, a communication unit 245 and a storage device 243 according to some implementations. These components of the computing device 200 are communicatively coupled to each other by a bus 220. Optionally, the computing device 200 can be a web server 111. In some embodiments, the computing device 200 can be a user device 115 or other servers.

The processor 235 includes an arithmetic logic unit, a microprocessor, a general purpose controller or some other processor array to perform computations and provide electronic display signals to a display device. The processor 235 is coupled to the bus 220 for communication with the other components via signal line 236. The processor 235 processes data signals and may include various computing architectures including a complex instruction set computer (CISC) architecture, a reduced instruction set computer (RISC) architecture, or an architecture implementing a combination of instruction sets. Although a single processor is shown in FIG. 2, multiple processors may be included. The processing capability may be limited to supporting the display of images and the capture and transmission of images. The processing capability might be enough to perform more complex tasks, including various types of feature extraction and sampling. Other processors, operating systems, sensors, displays and physical configurations may be possible.

The memory 237 stores instructions and/or data that may be executed by the processor 235. The memory 237 is coupled to the bus 220 for communication with the other components via signal line 238. The instructions and/or data may include code for performing the techniques described herein. The memory 237 may be a dynamic random access memory (DRAM) device, a static random access memory (SRAM) device, flash memory or some other memory device known in the art. In some embodiments, the memory 237 also includes a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device for storing data on a more permanent basis.

The communication unit 245 transmits and receives data to and from one or more of the user devices 115 and/or the web server 111 depending upon where the community detection module 103 may be stored. The communication unit 245 is coupled to the bus 220 via signal line 240. In some embodiments, the communication unit 245 includes a port for direct physical connection to the network 105 or to another communication channel. For example, the communication unit 245 includes a USB, SD, CAT-5 or similar port for wired communication with the user device 115. In some embodiments, the communication unit 245 includes a wireless transceiver for exchanging data with the user device 115 or other communication channel using one or more wireless communication methods, for example IEEE 802.11, IEEE 802.16, BLUETOOTH® or another suitable wireless communication method.

In some embodiments, the communication unit 245 includes a cellular communications transceiver for sending and receiving data over a cellular communications network, for example, via short messaging service (SMS), multimedia messaging service (MMS), hypertext transfer protocol (HTTP), direct data connection, WAP, electronic message or another suitable type of electronic communication. In some embodiments, the communication unit 245 includes a wired port and a wireless transceiver. The communication unit 245 also provides other conventional connections to the network 105 for distribution of one or more files and media objects using standard network protocols, for example, TCP/IP, HTTP, HTTPS and SMTP.

The storage device 243 can be a non-transitory memory that stores data used by the community detection module 103. In some embodiments the data is stored temporarily, for example, in a cache. The storage device 243 may be a dynamic random access memory (DRAM) device, a static random access memory (SRAM) device, flash memory or some other memory device known in the art. In some embodiments, the storage device 243 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. In the illustrated implementation, the storage device 243 is communicatively coupled by the bus 220 for communication with the other components of the computing device 200 via signal line 242. Although only one storage device is shown in FIG. 2, multiple storage devices may be included. In some other embodiments, the storage device 243 may not be included in the computing device 200 and can be communicatively coupled to the computing device 200 via the network 105.

In some embodiments, the data stored in the storage 243 includes tagset data, counts statistics data including co-occurrence counts graph, weighted tag co-occurrence consistency graph, importance scores, coherence scores, list of identified communities, community scores, recommendation scores, recommended tags, etc. The tagset data aggregator 203 maintains the tagset data in the storage 243 aggregated from the online services hosted by the web servers 111 in some implementations. Examples of tagsets aggregated may include video tags, bookmark tags, movie tags, etc. The counts statistics generated by the counts statistics engine 205 may include co-occurrence counts, marginal counts, total counts, co-occurrence probability and marginal probability associated with the tagset data. In some embodiments, the weighted graph generator 207 converts the co-occurrence counts graph into the weighted tag co-occurrence graph for storing in the storage 243. In some embodiments, the coherence engine 209 stores the importance scores determined for the tags in tagsets and the coherence scores determined for the tagsets in the storage 243. In some embodiments, the community detector 211 stores the communities detected using a greedy algorithm in the storage 243. In some embodiments, the tag recommendation engine 213 stores community scores, recommendation scores, etc. used in identifying the recommendation tags. The storage 243 may store other data for providing the functionality described herein.

In some embodiments, the community detection module 103 includes a controller 201, a tagset data aggregator 203, a counts statistics engine 205, a weighted graph generator 207, a coherence engine 209, a community detector 211, a tag recommendation engine 213 and a user interface module 215. These components of the community detection module 103 are communicatively coupled to each other via the bus 220. Persons of ordinary skill in the art will recognize that some of the components could run as a separate application on the same computing device 200 or a separate computing device 200. For example, the tagset data aggregator 203 could be a standalone application that runs on a separate server.

The controller 201 can be software including routines for receiving data via the communication unit 245, routing the data to the appropriate engine or module and transmitting responses from modules or engines to the communication unit 245 for transmission to the user device 115 or the web servers 111. In some embodiments, the controller 201 can be a set of instructions executable by the processor 235 to provide the functionality described below for managing data and handling communications between the community detection module 103 and other components of the computing device 200. In some embodiments, the controller 201 can be stored in the memory 237 of the computing device 200 and can be accessible and executable by the processor 235. The controller 201 may be adapted for cooperation and communication with the processor 235 and other components of the computing device 200 via signal line 221.

In some embodiments, the controller 201 identifies the type of data being received and transmits the data to the appropriate module or engine of the community detection module 103. For example, the controller 201 receives content (e.g., video, audio, image, etc.) from the web server 111 for rendering and transmits the content to the user interface module 215. In some other embodiments, the controller 201 receives user inputs and user actions submitted by the user 125 from the user device 115. The controller 201 sends the user actions and the user inputs to the appropriate module or engine of the community detection module 103. For example, the controller 201 receives a request to create one or more tags for content displayed on a web page hosted by the web server 111. The controller 201 then forwards the request to the tagset data aggregator 203.

In some embodiments, the controller 201 receives information from other components of the community detection module 103 and transmits the information to the appropriate component in the system 100 via the communication unit 245. For example, the controller 201 receives graphical data for generating a user interface from the user interface module 215. The controller 201 then transmits the graphical data to a display device (not shown) that is part of the user device 115. The graphical data causes the user device 115 to present the user interface to the user.

In some embodiments, the controller 201 receives data from components of the community detection module 103 and stores the data in the storage device 243. For example, the controller 201 receives data describing counts statistics for tagset data from the counts statistics engine 205 and stores the data in the storage device 243. In some embodiments, the controller 201 receives data determining coherence scores for communities detected by the community detector 211 and stores the coherence scores in the storage device 243. In some embodiments, the controller 201 retrieves data from the storage device 243 and sends the data to components of the community detection module 103. For example, the controller 201 retrieves data including pairs of tags from the storage device 243 as seeds for using in detecting communities and sends the data to the community detector 211.

The tagset data aggregator 203 can be software including routines for collecting data including tagsets from webpages of an online service hosted by a web server 111. In some embodiments, the tagset data aggregator 203 can be a set of instructions executable by the processor 235 to provide the functionality described below for collecting tagset data from webpages. In some embodiments, the tagset data aggregator 203 can be stored in the memory 237 of the computing device 200 and can be accessible and executable by the processor 235. In some implementations, the tagset data aggregator 203 can be adapted for cooperation and communication with the processor 235, the counts statistics engine 205 and other components of the computing device 200 via signal line 223.

In some embodiments, the tagset data aggregator 203 aggregates tagsets for content annotated by collaborative users of the online service. The collaborative users collaborate and create diverse tagsets to describe and organize content on the online service. Each tagset includes a plurality of tags describing a specific entity or topic. The tags include keywords or terms describing the entity that they are assigned to and allow the entity to be found again by browsing or searching on the online service. For example, a video sharing online service receives tags, such as "football", "super bowl", "touchdown", "field goal", etc. for a video clip that is associated with the sport football. In another example, a social bookmarking online service receives tags, such as "culinary", "cars", "travel", "fashion", etc. for web bookmarks that link to content that users find interesting. In some embodiments, the tagset data aggregator 203 receives and/or aggregates tags for content that already exist, and have been uploaded or bookmarked by the online service. For example, a music streaming online service includes music albums ready to play from which the user creates multiple playlists. The user then adds tags, such as "gym", "roadtrip", "party", etc. to describe the playlists.

In some embodiments, the tagset data aggregator 203 aggregates tagsets including a plurality of tags annotated by expert users. For example, an online advertising service receives tags, such as "basketball", "football", "scholarship", "political science", "sorority", etc. from expert advertisers that target high school students applying to colleges. In a second example, a movie review online service receives tags, such as "corruption", "bank robbery", "revenge", "adventure", "family", etc. from movie experts describing the movie entries associated with different genres.

In some instance, the tagset data aggregator 203 identifies a context for defining a tagset. In some embodiments, the context includes a resource tagset where tags are associated with a single resource. For example, the tags could be tags applied to images in a photo sharing online service. The resource tagset is useful in determining the relationships among tags and creating tag communities. In some embodiments, the context includes a session tagset that has tags for resources consumed in the same session. For example, the session tagset is useful in building a recommendation engine to predict the next image/video to recommend given the user's past browsing history within the session. In some embodiments, the context includes a user-consumed tagset that includes tags of resources consumed by the user. For example, user-consumed tags include tags for things viewed, commented on, etc. by the user and are used to generate user profiles. In some embodiments, the context includes a user-generated tagset that includes tags of resources generated by the user. For example, the user-generated tagset includes tags that the user applied to content items at multiple online services, for example, an online service for collecting recipes, a photo-sharing online service, a micro-blogging a social network, etc. In some embodiments, the tagset data aggregator 203 determines a vocabulary of all unique tags in the tagset data aggregated from the online service.

In some embodiments, the tagset data aggregator 203 stores data describing the tagset data and their size, the plurality of tags in each tagset, and the vocabulary of all unique tags determined for the tagset data in the storage 243. In some implementations, the tagset data aggregator 203 sends the vocabulary of all unique tags and/or the tagset data to the counts statistics engine 205, the coherence engine 209 and/or the community detector 211.

The counts statistics engine 205 can be software including routines for generating counts statistics from the tagset data. In some embodiments, the counts statistics engine 205 can be a set of instructions executable by the processor 235 to provide the functionality described below for generating counts statistics from the tagset data. In some embodiments, the counts statistics engine 205 can be stored in the memory 237 of the computing device 200 and can be accessible and executable by the processor 235. In some implementations, the counts statistics engine 205 may be adapted for cooperation and communication with the processor 235, the weighted graph generator 207 and other components of the computing device 200 via signal line 225.

In some embodiments, the counts statistics engine 205 receives tagset data including a plurality of tagsets from the tagset data aggregator 203 and determines counts statistics from the tagset data. The counts statistics generated may include co-occurrence counts, marginal counts, total counts, co-occurrence probability and marginal probability.

In some embodiments, the counts statistics engine 205 determines co-occurrence count over each pair of tags, $(\alpha,\beta)\in V\times V$, where "V" represents the vocabulary of all unique tags and each pair of tags $(\alpha,\beta)$ are elements of the set represented by the Cartesian Product $V\times V$. The co-occurrence count indicates the number of tagsets in which both tags $(\alpha,\beta)$ co-occur. For example, the equation for generating a co-occurrence count over each pair of tags (represented by the symbol "$\psi(\alpha,\beta)$)" can be:

$$\psi(\alpha,\beta)=\sum_{n=1}^{N}\delta(\alpha\in x^{(n)})\delta(\beta\in x^{(n)}),$$

where "δ(bool)" represents 1 if "bool" is true and 0 otherwise, the symbol "N" represents the tagset data size and the symbol "$x^{(n)}$" represents the $n^{th}$ tagset in the tagset data. The counts statistics engine 205 generates the co-occurrence counts graph (represented by the symbol "$[\psi(\alpha,\beta)]$") using the co-occurrence count determined over each pair of tags.

In some embodiments, the counts statistics engine 205 determines a co-occurrence count threshold "$\theta_{cooc}$" as an absolute value or a relative value based on the "N", the tagset data size. The counts statistics engine 205 sets the co-occurrence counts in the co-occurrence counts graph $[\psi(\alpha,\beta)]$ that are below the co-occurrence count threshold "$\theta_{cooc}$" to zero to control for noise in co-occurrence counts.

In some embodiments, the count statistics engine 205 determines marginal counts for all unique tags, $\alpha\in V$, where tag α is an element of the vocabulary of all unique tags "V". The marginal counts represent the number of co-occurrence pairs in which tag a occurred with some other tag in the tagsets data. For example, the equation for generating marginal counts for all unique tags (represented by the symbol "$\psi(\alpha)$") can be:

$$\psi(\alpha)=\sum_{\beta\in V}\psi(\alpha,\beta),$$

where "$\psi(\alpha,\beta)$" represents the co-occurrence counts graph and each tag "β" is an element of the vocabulary of all unique tags "V". The marginal counts "$\psi(\alpha)$" is determined by adding each row of the co-occurrence counts graph $[\psi(\alpha,\beta)]$.

In some embodiments, the counts statistics engine 205 determines total counts which represents the total number of pairs in which some tag co-occurred with some other tag in the tagset data. For example, the equation for generating total counts (represented by the symbol "$\psi_0$") can be:

$$\psi_0 = \frac{1}{2}\sum_{\alpha\in V}\sum_{\beta\in V}\psi(\alpha, \beta),$$

where "$\psi(\alpha,\beta)$" represents the symmetrical co-occurrence counts graph, each tag $\alpha$ and $\beta$ are elements of the vocabulary of all unique tags "V". The total counts "$\psi_0$" is determined by adding all the elements in the upper triangular co-occurrence counts graph [$\psi(\alpha,\beta)$].

In some embodiments, the counts statistics engine 205 generates the co-occurrence probability for each pair of tags "$(\alpha,\beta)$" and the marginal probability for all unique tags "$\alpha$" based on the counts determined above. For example, the equations for generating co-occurrence and marginal probabilities (represented by "$P(\alpha,\beta)$" and $P(\alpha)$ respectively) can be:

$$P(\alpha, \beta) = \frac{\psi(\alpha, \beta)}{\psi_0},\ P(\alpha) = \frac{\psi(\alpha)}{\psi_0}$$

In some embodiments, the counts statistics engine 205 sends the data describing the counts statistics to the weighted graph generator 207. In some embodiments, the counts statistics engine 205 stores the counts statistics generated for the tagset data in the storage 243.

The weighted graph generator 207 can be software including routines for generating a weighted graph from the co-occurrence counts graph. In some embodiments, the weighted graph generator 207 can be a set of instructions executable by the processor 235 to provide the functionality described below for generating a weighted graph. In some embodiments, the weighted graph generator 207 can be stored in the memory 237 of the computing device 200 and can be accessible and executable by the processor 235. In some implementations, the weighted graph generator 207 may be adapted for cooperation and communication with the processor 235, the coherence engine 209 and other components of the computing device 200 via signal line 227.

The counts statistics engine 205 determines the initial co-occurrence counts equally for both noisy and signal pairs of tags in the co-occurrence counts graph. For example, in the tagset {London, UK, Olympic, ceremony, bus, transportation}, the counts statistics engine 205 cannot identify whether certain pair of tags is noise (e.g., {London, bus}) or signal (e.g., {bus, transportation}) and determines the initial co-occurrence counts for both pairs equally. In some embodiments, the weighted graph generator 207 receives the counts statistics including the co-occurrence counts graph from the counts statistics engine 205. The weighted graph generator 207 generates a weighted tag co-occurrence consistency graph (referred to herein as "weighted tag co-occurrence graph") from the co-occurrence counts graph to discard co-occurrence counts between noisy pairs and to keep the co-occurrence counts between signal pairs. In some embodiments, the weighted graph generator 207 generates a measure of co-occurrence consistency for each pair of tags included in the co-occurrence counts graph and creates a weighted tag co-occurrence graph. The measure of co-occurrence consistency measures how much more likely is it for each pair of tags to co-occur in a tagset relative to a random chance. For example, the equation for generating co-occurrence consistency measure for each pair of tags (represented by the symbol "$\phi(\alpha,\beta)$") can be given by the Normalized Point-wise Mutual information (NMI):

$$\phi(\alpha, \beta) = \frac{\log\left(\frac{P(\alpha, \beta)}{P(\alpha)P(\beta)}\right)}{\frac{1}{\log(P(\alpha, \beta))}},$$

where $P(\alpha,\beta)$ is the co-occurrence probability associated with each pair of tags $(\alpha,\beta)$, $P(\alpha)$ and $P(\beta)$ are the marginal probabilities associated with the respective unique tags $\alpha$ and $\beta$. The range of the computed NMI "$\phi(\alpha,\beta)$" is in the range [0, 1].

The joint probability for each pair of tags (e.g., $P(\alpha,\beta)$) as compared to their random chance (e.g., $P(\alpha)P(\beta)$) determines the strength of the co-occurrence consistency for each pair of tags. For example, consider two frequent tags (e.g., {Chris, Eiffel tower}) that can co-occur frequently just out of random chance compared to two relatively rare tags (e.g., {global warming, greenhouse emissions}) that co-occur out of real association. The joint probability determined for the rare tags {global warming, greenhouse emissions} will be more compared to that of the frequent tags {Chris, Eiffel tower} indicating that the rare tags have co-occurred with high consistency.

In some embodiments, weighted graph generator 207 performs a denoising operation on the weighted tag co-occurrence graph to remove pairs of tags with low measures of co-occurrence consistency representing noise in the weighted tag co-occurrence graph. The weighted graph generator 207 uses a co-occurrence consistency threshold "$\theta_{consy}$" to determine whether a certain pair of tags (e.g., {London, bus}) is noise and whether a certain other pair of tags (e.g., {bus, transportation}) is signal in the weighted tag co-occurrence graph. In some embodiments, the weighted graph generator 207 iteratively performs denoising operation on the weighted tag co-occurrence graph. The weighted graph generator 207 starts with the first pair of tags in the weighted tag co-occurrence graph. In each iteration of the denoising operation, the weighted graph generator 207 determines whether the co-occurrence consistency measured for each pair of tags in the weighted tag co-occurrence graph is greater than the co-occurrence consistency threshold "$\theta_{consy}$". If the co-occurrence consistency measured for a pair of tags is greater than "$\theta_{consy}$" the weighted graph generator 207 computes new marginal counts "$\psi(\alpha)$" and total counts "$\psi_0$", determines a new measure of co-occurrence consistency for the pairs of tags based on the new marginal and total counts and updates the weighted tag co-occurrence graph with the new measure of co-occurrence consistency for the pairs of tags. If the co-occurrence consistency measured for the pair of tags is lower than "$\theta_{consy}$", then the weighted graph generator 207 removes an edge from the pair of tags from the weighted tag co-occurrence graph as noise. The weighted graph generator 207 ends the iteration for the denoising operation only when all the pairs of tags (i.e., edges) in the weighted tag co-occurrence graph are determined to be above the "$\theta_{consy}$".

In some embodiments, the effect of denoising operation results in increased co-occurrence consistency measured for a tag with other related tags present in a tagset. For example, in the tagset {bride, reception, marriage, cake, love, jason, chris}, responsive to the denoising operation performed at each iteration, the co-occurrence consistency of related tags, such as {bride, reception}, {marriage, love}, {reception, marriage}, etc. increases while it decreases to zero for unrelated tags, such as {marriage, chris} or {reception, jason} in the weighted tag co-occurrence graph.

In some embodiments, the weighted graph generator 207 measures a quality of the resulting weighted tag co-occurrence graph in each iteration of the denoising operation. For example, the equation for measuring the quality of the weighted tag co-occurrence graph (represented by "$Q(\phi_k)$") in each iteration can be:

$$Q(\phi_k) = \sum_{(\alpha,\beta)\in V\times V} P_k(\alpha, \beta)\phi_k(\alpha, \beta),$$

where $\phi_k$ is the weighted tag co-occurrence graph at the $k^{th}$ iteration of the denoising operation, $P_k(\alpha,\beta)$ is the co-occurrence probability of the pair of tags $(\alpha,\beta)$ at the $k^{th}$ iteration of the denoising operation and $\phi_k(\alpha,\beta)$ is the measure of co-occurrence consistency for the pair of tags $(\alpha,\beta)$ in the weighted tag co-occurrence graph at the $k^{th}$ iteration of the denoising operation.

In some embodiments, the weighted graph generator 207 sends data including the weighted tag co-occurrence graph to the coherence engine 209. In some embodiments, the weighted graph generator 207 stores the weighted tag co-occurrence graph in the storage 243.

The coherence engine 209 can be software including routines for determining a coherence score of tagsets in the tagset data. In some embodiments, the coherence engine 209 can be a set of instructions executable by the processor 235 to provide the functionality described below for determining a coherence score. In some embodiments, the coherence engine 209 can be stored in the memory 237 of the computing device 200 and can be accessible and executable by the processor 235. In some implementations, the coherence engine 209 may be adapted for cooperation and communication with the processor 235, the community detector 211 and other components of the computing device 200 via signal line 229.

In some embodiments, the coherence engine 209 retrieves the tagset data and the tag co-occurrence graph including the co-occurrence consistency between all pairs of tags from the storage 243 to determine the importance scores of all tags in a tagset. In some embodiments, the coherence engine 209 receives the tagset data from the tagset data aggregator 203 and the tag co-occurrence graph from the weighted graph generator 207 to determine the importance scores for all tags in a tagset. The coherence engine 209 determines the importance score to identify which of the tags are more central to the theme of community than others in the tagset. For example, consider two tagsets: Tagset A: {rain, storm, cloudy, umbrella, chocolate} and Tagset B: {candy, cocoa, chocolate, coffee}. Both tagsets contain the tag "chocolate" but it really belongs in Tagset B (i.e., it is highly connected to other tags in Tagset B) and not in Tagset A. In other words, the relative importance of this tag "chocolate" is different in the two tagsets. Thus, the tag "chocolate" may be considered peripheral or noisy to the overall tagset A or may be considered quite central to the tagset B.

In some embodiments, the coherence engine 209 initializes the importance scores (e.g., $\rho_i^{(t)}$ is the importance score of tag $x_i$ in iteration t) for all tags in a tagset (e.g., $x=\{x_1, x_2, \ldots, x_m\}$ is the set of m tags) to be equal (e.g., $\rho_i^{(0)}=1\forall i=1 \ldots m$). The coherence engine 209 then updates the importance scores iteratively until convergence. For example, the equation for convergence of importance score (represented by "$\rho_i^{(t+1)}$") in each iteration can be:

$$\rho_i^{(t+1)} = \frac{1}{\rho_{norm}^{(t)}}\sum_{j=1}^{m}\rho_j^{(t)}\phi(x_i, x_j),$$

where $\phi(x_i, x_j)$ is the co-occurrence consistency measured between tags $x_i$ and $x_j$ in this tagset. $\rho_{norm}^{(t)}$ is the $L_2$ norm of the importance vector in the $t^{th}$ iteration and can be:

$$\rho_{norm}^{(t)} = \left(\sum_{i=1}^{m}(\rho_j^{(t)})^2\right)^{\frac{1}{2}},$$

The importance vector converges to the first unnormalized Eigenvector of the (m×m) matrix: $\Phi(x)=[\phi(x_i, x_j)]$. That is, if $\lambda_1(\Phi(x))$ is the first Eigenvalue and $v_1$ $(\Phi(x))$ is the first (normalized) Eigenvector of this matrix then:

$$\rho(x)=\lambda_1(\Phi(x))\times v_1(\Phi(x))$$

The importance scores quantify which tag in a tagset is most central to the theme of community and is well connected to other tags. For example, consider the example tagset {wimbeldon: 1.02, lawn: 0.98, tennis: 0.95, net: 0.88, court: 0.83, watching: 0.83, players: 0.81} including importance scores for each tag. The tag "wimbeldon" is the most important tag in this tagset and the contextual association of the tag "wimbeldon" with tags, such as "lawn", "tennis" is higher than with other tags, such a, "watching", "players". The peripheral tags, such as "watching", "players" have the least importance score. In some embodiments, the coherence engine 209 ranks the tags within the tagset based on the importance score. Although the example uses the highest importance score as indicative of the most importance, persons of ordinary skill in the art will recognize that difference scales of scores are possible. For example, in one embodiment, the least importance score is indicative of the most importance.

In an embodiment, coherence engine 209 determines a coherence score for the plurality of tagsets in the tagset data. The coherence score associated with a tagset is a measure of community-ness that is used by the community detector 211 described below in detecting communities. The coherence engine 209 determines the coherence score for a tagset based on the importance scores of the tags in the tagset. The coherence score of a tagset is high when the consistency of a tag is high with all other tags in the tagset and this is also true for all other tags in the tagset. If a tag in the tagset is not highly consistent with all the other tags in the tagset, then the coherence of the tagset goes down. For example, the equation for determining a coherence score (represented by "$\pi(x|\Phi)$") for a tagset $x=\{x_1, x_2, \ldots, x_m\}$ can be:

$$\pi(x|\Phi)=\min_{i=1 \ldots m}\{\rho_i\},$$

where $\rho_i$ is the importance score of tag $x_i$. The coherence engine 209 measures the coherence score of a tagset to be the minimum importance score of all tags in the tagset. The least important tag in the tagset bounds the coherence of the tagset. For example, consider the example tagset {wimbeldon: 1.02, lawn: 0.98, tennis: 0.95, net: 0.88, court: 0.83, watching: 0.83, players: 0.81} including importance scores for each tag. The coherence score determined for this example tagset is 0.81 which is the importance score of the tag "players".

Figure 3:
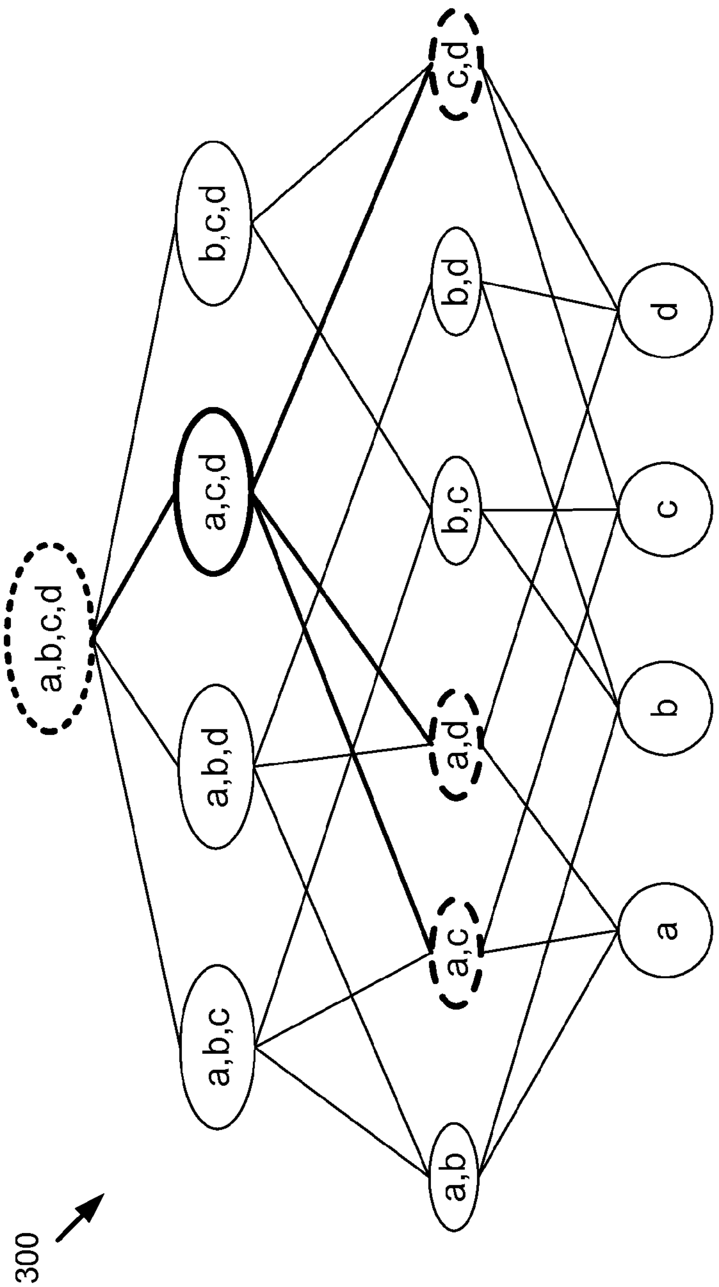
FIG. 3 is an example graphic representation illustrating a power set of a tagset associated with tagset data.

In some embodiments, the coherence engine 209 defines a notion of community based on coherence scores determined for the plurality of tagsets. Referring now to FIG. 3, a graphic representation of a powerset 300 of an example tagset x={a, b, c, d} is illustrated. Each node of the graphic representation is a subset of the tag vocabulary "V" and is a potential candidate for representing a community. In some embodiments, the coherence engine 209 determines a neighborhood of a tagset for defining a notion of community. For example, the neighborhood of a tagset x (represented by "$\mathcal{N}$ (x)") can be:

$$\mathcal{N}(x)=\mathcal{N}_+(x)\cup\mathcal{N}_-(x),$$

where $\mathcal{N}_+$(x) denotes the up-neighbors of tagset x in the lattice space of the powerset 300 obtained by adding a tag currently not in tagset x and $\mathcal{N}_-$(x) denotes the down-neighbors in the in the lattice space obtained by removing a tag currently in tagset x. For example, the equation for $\mathcal{N}_+$(x) and $\mathcal{N}_-$(x) can be:

$$\mathcal{N}_+(x)=\{y=v\oplus x, \forall v\in V\backslash x\},$$

$$\mathcal{N}_-(x)=\{y=x\backslash v, \forall v\in x\},$$

where "V" represents the vocabulary of all tags and "v" represents the tag that is added to or removed from the tagset x. Referring to the graphic representation of the powerset 300, for example, the down-neighbor (i.e., $\mathcal{N}_-$({a, c, d})) of tagset {a, c, d} is the group of tagsets {{a. c}, {a, d}, {c, d}}. The coherence engine 209 identifies these tagsets {{a. c}, {a, d}, {c, d}} by removing exactly one tag from tagset {a, c, d}. The up-neighbor (i.e., $\mathcal{N}_+$({a, c, d})) of tagset {a, c, d} is the tagset {a, b, c, d}. The coherence engine 209 identifies the tagset {a, b, c, d} by adding exactly one tag to tagset {a, c, d}.

In some embodiments, the coherence engine 209 compares the coherence score of a tagset with the coherence scores determined for its neighbors and identifies the tagset as a community if the tagset is a "local maxima of coherence". For example, the coherence engine 209 determines a tagset x* as a "local maxima of coherence" if:

$$\pi(x^*)\geq\pi(y), \forall y\in\mathcal{N}(x^*),$$

where $\mathcal{N}$ (x*) represents the neighborhood of tagset x*.

For example, in the graphic representation of the powerset 300, the coherence of tagset {a, c, d} is greater than the coherence of all its neighbors. The coherence engine 209 compares the coherence scores of each tagset with all its neighbors and identifies the tagset {a, c, d} as a local maxima of coherence and, therefore, as a community.

In some embodiments, the coherence engine 209 sends data including the importance scores of tags in the tagset data and coherence scores of all tagsets from the tagset data to the community detector 211. In some embodiments, the coherence engine 209 stores the data including the importance scores and coherence scores in the storage 243.

The community detector 211 can be software including routines for detecting communities in the weighted tag co-occurrence graph. In some embodiments, the community detector 211 can be a set of instructions executable by the processor 235 to provide the functionality described below for detecting communities. In some embodiments, the community detector 211 can be stored in the memory 237 of the computing device 200 and can be accessible and executable by the processor 235. In some implementations, the community detector 211 may be adapted for cooperation and communication with the processor 235, the tag recommendation engine 213 and other components of the computing device 200 via signal line 231.

In some embodiments, the community detector 211 receives data including importance scores, coherence scores, etc. from the coherence engine 209 and the data including the weighted tag co-occurrence graph from the weighted graph generator 207. In some embodiments, the community detector 211 retrieves the data including importance scores, coherence scores, weighted tag co-occurrence graph, etc. from the storage 243. In some embodiments, the community detector 211 applies a greedy algorithm to detect all communities (local maxima of coherence) in the weighted tag co-occurrence graph.

In some embodiments, the community detector 211 determines each pair of tags from the vocabulary of all tags as a starting seed (represented as $x_0(\alpha,\beta), x_1(\alpha,\beta), \ldots, x_n(\alpha,\beta)$) to detect as many communities in the weighted tag co-occurrence graph. The community detector 211 determines whether each pair of tags used as a starting seed is above the co-occurrence consistency threshold "$\theta_{consy}$" and identifies the starting seed as a current tagset (represented by "x"). In some embodiments, the greedy algorithm includes a grow phase and a grow-shrink phase. In the grow phase, the community detector 211 iteratively adds the best tag to the current tagset x that results in a maximally coherent community (represented by "$x^+$"). The community detector 211 instructs the coherence engine 209 to determine the coherence score whenever a next best tag is added to the current tagset x. The community detector 211 ends the grow phase when the coherence score of the current tagset is determined to be less with the next best tag added in the last iteration. The community detector 211 generates the largest possible candidate seed (i.e., current tagset x) from the original starting seed ($x_0(\alpha,\beta)$) using the grow phase.

In some embodiments, the community detector 211 begins the grow-shrink phase responsive to generating the largest possible candidate seed. In a first step of the grow-shrink phase, the community detector 211 adds a first tag to the current tagset x that results in a maximally coherent community $x^+$ (referred as grow neighbor) and removes a second tag from the current tagset that results in a maximally coherent community $x^-$ (referred as shrink neighbor). For example, the equation for maximally coherent communities $x^+$ and $x^-$ can be:

$$\begin{aligned} x^+ &= \text{Grow}(x \mid \Phi) \\ &= \arg\max_{\overline{x}\in\mathcal{N}_+(x)}\{\pi(\overline{x})\}, \\ x^- &= \text{Shrink}(x \mid \Phi) \\ &= \arg\max_{\overline{x}\in\mathcal{N}_-(x)}\{\pi(\overline{x})\}, \end{aligned}$$

where $\mathcal{N}_+$(x) denotes the up-neighbors of tagset x and $\mathcal{N}_-$(x) denotes the down-neighbors of tagset x.

In some embodiments, the community detector 211 generates a candidate set (referred by "$C_\theta(x)$") for the current tagset. The candidate set reduces the computational complexity in the grow step of the grow-shrink phase which results in the maximally coherent community $x^+$(grow neighbor). The computational complexity in the grow step includes exhaustively computing the coherence $\pi(\overline{x})$, $\forall\overline{x}\in\mathcal{N}_+(x)$ since there are $|\mathcal{N}_+(x)|=|V|-|X|$ possible choices. The generated candidate set includes the set of tags (referred by "v") such that the set of tags are connected with all the tags in tagset x with a co-occurrence consistency measured higher than $\theta_{consy}$. For example, the equation for generating a candidate set $C_\theta(x)$ can be:

$$C_\theta(x)=\{\langle v,\kappa(v|x,\Phi)\rangle\}, \text{ where, } \forall v\in\mathcal{N}_+(x):$$

$$\kappa(v|x,\Phi)=\min_{x\in x}\{\phi(v,x)\}\geq\theta_{consy}.$$

In the grow step of the grow-shrink phase, the community detector 211 identifies the top candidate v with the highest value $\kappa(v|x,\Phi)$ from the candidate set $C_\theta(x)$ instead of performing an exhaustive search. For example, the first tag added to the current tagset above which results in the grow neighbor $x^+$ can be a top candidate from the candidate set $C_\theta(x)$. The value $\kappa(\nu|x,\Phi)$ is high if a tag $\nu$'s co-occurrence consistency with all elements of tagset x is high. In some embodiments, the community detector 211 updates the candidate set $C_\theta(x)$ when the tagset grows as a result of adding one more element $\nu^*$. The candidate set is updated as shown:

$$\kappa(\nu|x,\Phi)\leftarrow\min\{\kappa(u|x),\phi(u,\nu^*)\},\forall u\in C_\theta(x)\{\nu^*\}$$

In the shrink step of the grow-shrink phase, the community detector 211 determines the tag with a least important score of all the tags in the current tagset x and removes the least important tag. For example, the second tag removed from the current tagset x above which results in the shrink neighbor $x^-$ is the least important tag.

In some embodiments, the community detector 211 instructs the coherence engine 209 to determine the coherence scores of the grow neighbor $x^+$ and the shrink neighbor $x^-$. The community detector 211 compares the coherence of the grow neighbor $x^+$ with that of the shrink neighbor $x^-$ as a second step in the grow-shrink phase. If the coherence score of the grow neighbor $x^+$ is greater than that of the shrink neighbor $x^-$, the community detector 211 determines that the grow step of the grow-shrink phase is ideal to continue, identifies the grow neighbor $x^+$ as the next tagset $x_{next}$, adds a next tag (top candidate $\nu$) from the candidate set $C_\theta(x)$ to the next tagset $x_{next}$ and instructs the coherence engine 209 to determine the coherence score of this next tagset $x_{next}$. If the coherence score of the shrink neighbor $x^-$ is greater than that of the grow neighbor $x^+$, the community detector 211 determines that the shrink step of the grow-shrink phase is ideal to continue, identifies the shrink neighbor $x^-$ as the next tagset $x_{next}$, removes a next tag that is least important from the next tagset $x_{next}$ and instructs the coherence engine 209 to determine the coherence score of this next tagset $x_{next}$.

In some embodiments, the community detector 211 compares the coherence of the next tagset $x_{next}$ with the coherence of the current tagset x as a last step in the grow shrink phase. If the coherence score of the current tagset x is greater than the coherence score of the next tagset $x_{next}$, then the community detector 211 determines that the current tagset x to be a local maxima $x^*$ with a coherence $\pi(x^*)$ satisfying the equation:

$$\pi(x^*)\geq\max\{\pi(x^+=\text{Grow}(x^*)),\pi(x^-=\text{Shrink}(x^*))\}$$

The grow-shrink phase converges when neither the grow neighbor $x^+$ nor the shrink neighbor $x^-$ result in a tagset whose coherence is higher than that of the current tagset x. The community detector 211 determines the local maxima $x^*$ as a community.

If the coherence score of the next tagset $x_{next}$ is greater than the coherence of the current tagset x, then the community detector 211 determines that a local maxima has not been reached yet, identifies the next tagset $x_{next}$ as the current tagset x and repeats the community detection process from the first step of the grow-shrink phase. The community detector 211 alternates between the grow and shrink phase depending on which phase leads to the highest increase in the coherence value.

In some embodiments, the community detector 211 detects a plurality of communities that are duplicates of each other generated using multiple starting seeds. For example, the tags are a, b, c, and d. If tags {a, b} are seeds, the community detector 211 generates {a, b, c} as a community. If tags {a, c} are seeds, the community detector 211 generates {a, b, c} as a community. As a result, two different seeds result in generating the same community, so the community detector 211 eliminates the duplicate communities (de-dupes) obtained from all the seeds and the final output contains only one copy of the community {a, b, c}.

In some embodiments, the community detector 211 sends the data including communities detected to the tag recommendation engine 213. In some embodiments, the community detector 211 stores the data including the communities detected in the storage 243.

The tag recommendation engine 213 can be software including routines for recommending tags in real time for new content using the communities. In some embodiments, the tag recommendation engine 213 can be a set of instructions executable by the processor 235 to provide the functionality described below for recommending tags in real time. In some embodiments, the tag recommendation engine 213 can be stored in the memory 237 of the computing device 200 and can be accessible and executable by the processor 235. In some implementations, the tag recommendation engine 213 may be adapted for cooperation and communication with the processor 235, the tagset data aggregator 203, the community detector 211 and other components of the computing device 200 via signal line 233. In some embodiments, the tag recommendation engine 213 is a standalone application that communicates with the community detection module 103.

In some embodiments, the tag recommendation engine 213 receives the data including communities from the community detector 211 and the data including importance scores from the coherence engine 209. In some embodiments, the tag recommendation engine 213 retrieves the data including communities and importance scores of tags within the communities from the storage 243.

In some embodiments, the tag recommendation engine 213 receives a set of first input tags describing new content from the tagset data aggregator 203. For example, a user inputs a tagset {"snowboard", "frontside", "railslide"} describing a snowboarding video on a video sharing online service. In some embodiments, the tag recommendation engine 213 determines a community score for each community including at least one input tag from the input tagset. The tag recommendation engine 213 determines the community score by adding the importance score for the at least one input tag found within each community. For example, a community "y" includes tags (e.g., {"snowboard", "frontside", "railslide", "superpipe", "ramp", "720"}) along with importance scores (e.g., {1.5, 2.0, 1.2, 3.0, 2.0, 1.3}) for each tag. The tag recommendation engine 213 determines the community score for the community "y" to be "4.7" by computing the sum of the importance scores for the input tags {"snowboard", "frontside", "railslide"} found within the community.

In some embodiments, the tag recommendation engine 213 determines a recommendation score for each of the remaining tags found within each community that were absent from the input tagset. The tag recommendation engine 213 determines the recommendation score by multiplying the importance score of each of the remaining tags with the community score identified for each community including each of the remaining tags. For example, in the community "y", the tag recommendation engine 213 determines the recommendation score for each of the remaining tags {"superpipe", "ramp", "720"} to be {14.1, 9.4, 6.11} by multiplying their importance scores {3.0, 2.0, 1.3} with the community score 4.7. In some embodiments, the tag recommendation engine 213 adds the recommendation scores determined separately for each of the remaining tags that were found to be common within one or more communities. For example, a community "z" includes tags {"superpipe", "ramp", "shredding", "rotations"}, the tag recommendation engine 213 identifies tags {"superpipe", "ramp"} in community "z" to be common with community "y" and adds the two recommendation scores computed separately for the tags {"superpipe", "ramp"} in the two communities "y" and "z".

In some embodiments, the tag recommendation engine 213 sorts the recommendation scores determined for each of the remaining tags in a descending order. In some embodiments, the tag recommendation engine 213 recommends one or more tags with the highest recommendation scores as additional tags for the new content. In some embodiments, the tag recommendation engine 213 sends the recommended tags to the user interface module 215 and instructs the user interface module 215 to display the recommended tags in real time adjacent to the first input tags entered by the user. For example, the tag recommendation engine 213 determines the tags {"superpipe", "720"} as having high recommendation scores. The tag recommendation engine 213 then recommends the tags as additional entries to the input tagset {"snowboard", "frontside", "railslide"} for the snowboarding video in real time.

The user interface module 215 can be software including routines for generating graphical data for providing user interfaces to users. In some embodiments, the user interface module 215 can be a set of instructions executable by the processor 235 to provide the functionality described below for generating graphical data for providing user interfaces that includes information from the web server 111. In some embodiments, the user interface module 215 can be stored in the memory 237 of the computing device 200 and is accessible and executable by the processor 235. In some implementations, the user interface module 215 can be adapted for cooperation and communication with the processor 235 and other components of the community detection module 103 via signal line 234.

In some embodiments, the user interface module 215 receives instructions from the tag recommendation engine 213 to generate graphical data that depicts tag recommendations in real time. In some embodiments, the user interface module 215 receives instructions from the tagset data aggregator 203 to generate a user interface for adding or deleting a tag. In some other embodiments, the user interface module 215 generates graphical data for requested content based at least in part on instructions from the online service engine 109. For example, the user interface module 215 generates graphical data for displaying the community of images, publication text, videos, etc. The user interface module 215 sends the graphical data to an application (e.g., a browser 177) in the user device 115 via the communication unit 245 causing the application to display the data in a user interface.

Methods

Figure 4:
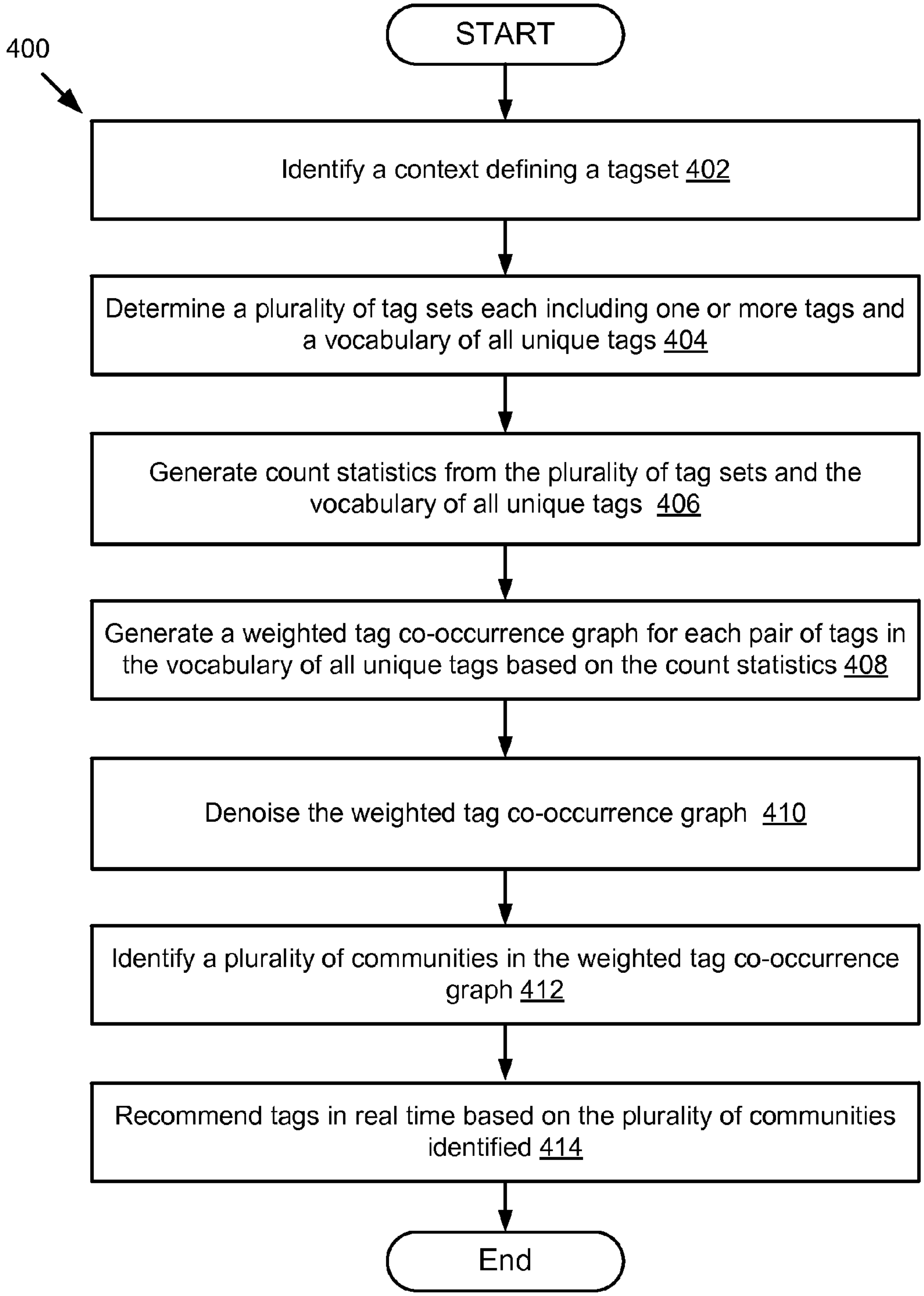
FIG. 4 is a flowchart of an example method for recommending tags using the communities detected in a weighted tag co-occurrence graph.

Referring now to FIG. 4, a flowchart 400 of an example method for recommending tags using the communities is described. The community detection module 103 includes a tagset data aggregator 203, a counts statistics engine 205, a weighted graph generator 207, a community detector 211 and a tag recommendation engine 213. The tagset data aggregator 203 identifies 402 a context defining a tagset. In some embodiments, the context includes a resource tagset where tags are associated with a single resource. For example, the tags could be tags applied to images in a photo sharing online service. The tagset data aggregator 203 determines 404 a plurality of tagsets each including one or more tags and a vocabulary of all unique tags. The counts statistics engine 205 generates 406 count statistics from the plurality of tagsets and the vocabulary of all unique tags. The count statistics generated include co-occurrence counts, marginal counts, total counts, co-occurrence probability and marginal probability. The weighted graph generator 207 generates 408 a weighted tag co-occurrence graph for each pair of tags in the vocabulary of all unique tags based on the count statistics and denoises 410 the weighted tag co-occurrence graph. The weighted graph generator 207 uses a co-occurrence consistency threshold "$\theta_{consy}$" to determine whether a certain pair of tags is noise and whether a certain other pair of tags is signal in the weighted tag co-occurrence graph. The community detector 211 identifies 412 a plurality of communities in the weighted tag co-occurrence graph. The communities are each a local maxima of coherence. The tag recommendation engine 213 recommends 414 tags in real time based on the plurality of communities identified. For example, a user inputs a tagset {"snowboard", "frontside", "railslide"} describing a snowboarding video, the tag recommendation engine 213 recommends tags {"superpipe", "720"} in real time as additional tag entries.

Figure 5A:
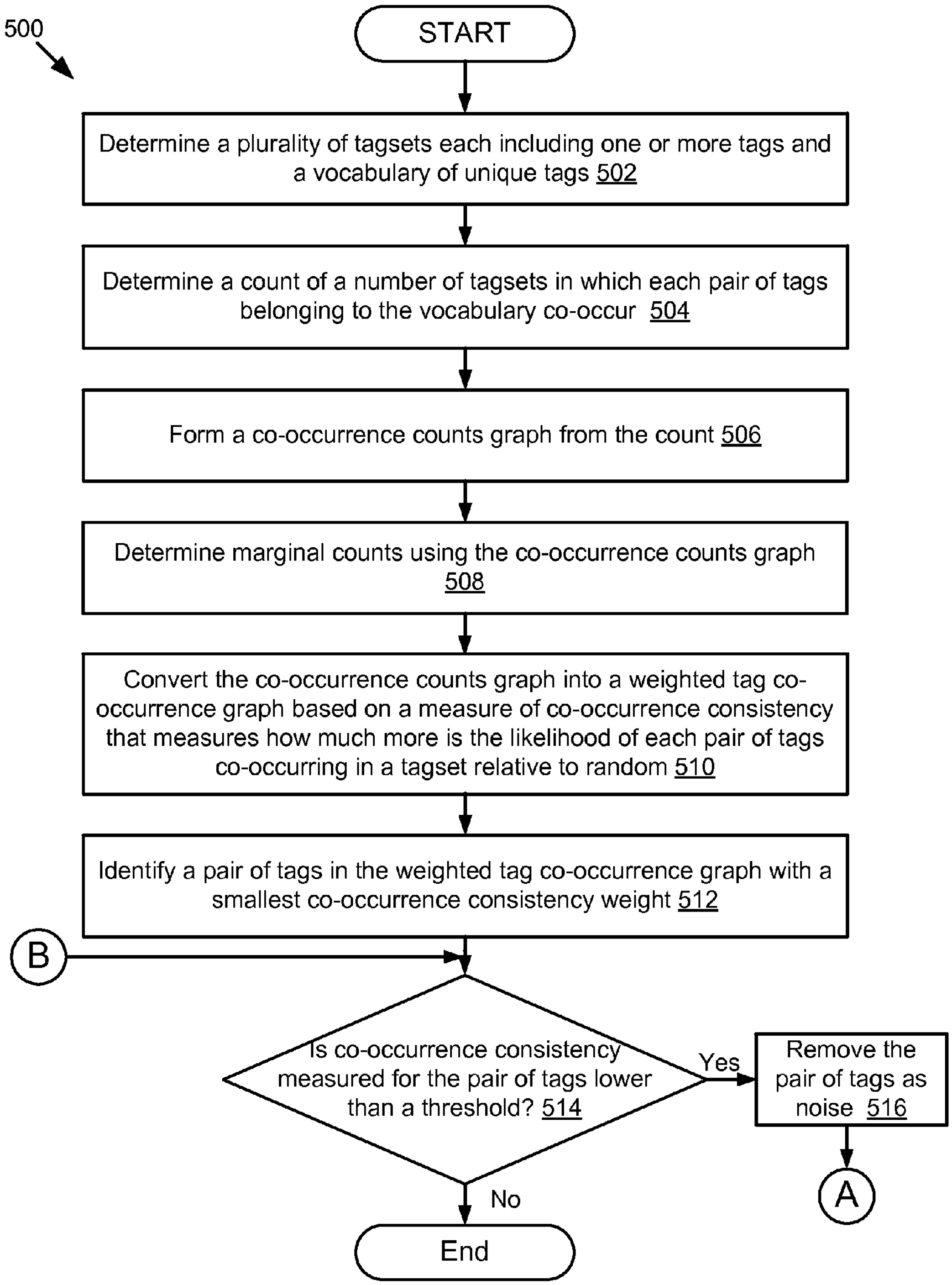
FIGS. 5A and 5B are flowcharts of an example method for removing noise from the weighted tag co-occurrence graph.
Figure 5B:
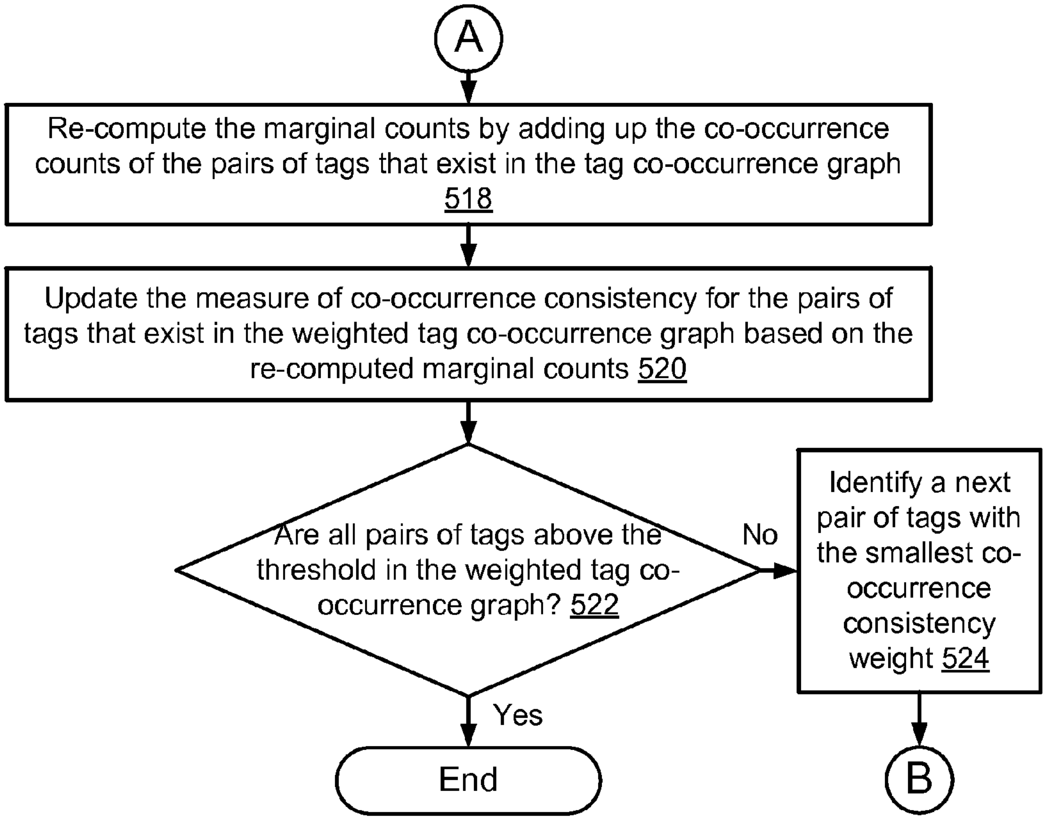

FIGS. 5A and 5B are flowcharts 500 of an example method for removing noise from a weighted tag co-occurrence graph. The community detection module 103 includes a tagset data aggregator 203, a counts statistics engine 205 and a weighted graph generator 207. The tagset data aggregator 203 determines 502 a plurality of tagsets each including one or more tags and a vocabulary of unique tags. The tags include keywords or terms describing an entity. For example, a video sharing online service receives tags, such as "football", "super bowl", "touchdown", "field goal", etc. for a video clip. The counts statistics engine 205 determines 504 a count of a number of tagsets in which each pair of tags belonging to the vocabulary co-occur. The counts statistics engine 205 forms 506 a co-occurrence counts graph from the count and determines 508 marginal counts using the co-occurrence counts graph. The weighted graph generator 207 converts 510 the co-occurrence counts graph into a weighted tag co-occurrence graph based on a measure of co-occurrence consistency that measures how much more is the likelihood of each pair of tags co-occurring in a tagset relative to random. The weighted co-occurrence graph uses the measure of co-occurrence consistency to discard co-occurrence counts between noisy pairs and to keep the co-occurrence counts between signal pairs. The weighted graph generator 207 identifies 512 a pair of tags in weighted tag co-occurrence graph with a smallest co-occurrence consistency weight and determines 514 whether the co-occurrence consistency measured for the pair of tags is lower than a threshold. The threshold is a co-occurrence consistency threshold "$\theta_{consy}$". If the co-occurrence consistency measured for the pair of tags is not lower than the threshold, then the flowchart 500 ends. If the co-occurrence consistency measured for the pair of tags is lower than the threshold, the weighted graph generator 207 removes 516 the pair of tags as noise and proceeds to step 518 The weighted graph generator 207 recomputes 518 the marginal counts by adding up the co-occurrence counts of the pairs of tags that exist in the tag co-occurrence graph and updates 520 the measure of co-occurrence consistency for the pairs of tags that exist in the weighted tag co-occurrence graph based on the re-computed marginal counts. The weighted graph generator 207 determines 522 whether all the pairs of tags in the weighted tag co-occurrence graph are above the threshold. If not all the pairs of tags are above the threshold, the weighted graph generator 207 identifies 524 a next pair of tags with the smallest co-occurrence consistency weight and repeats the process from step 514. The weighted graph generator 207 ends the process only when all the pairs of tags (i.e., edges) in the weighted tag co-occurrence graph are determined to be above the "$\theta_{consy}$".

Figure 6A:
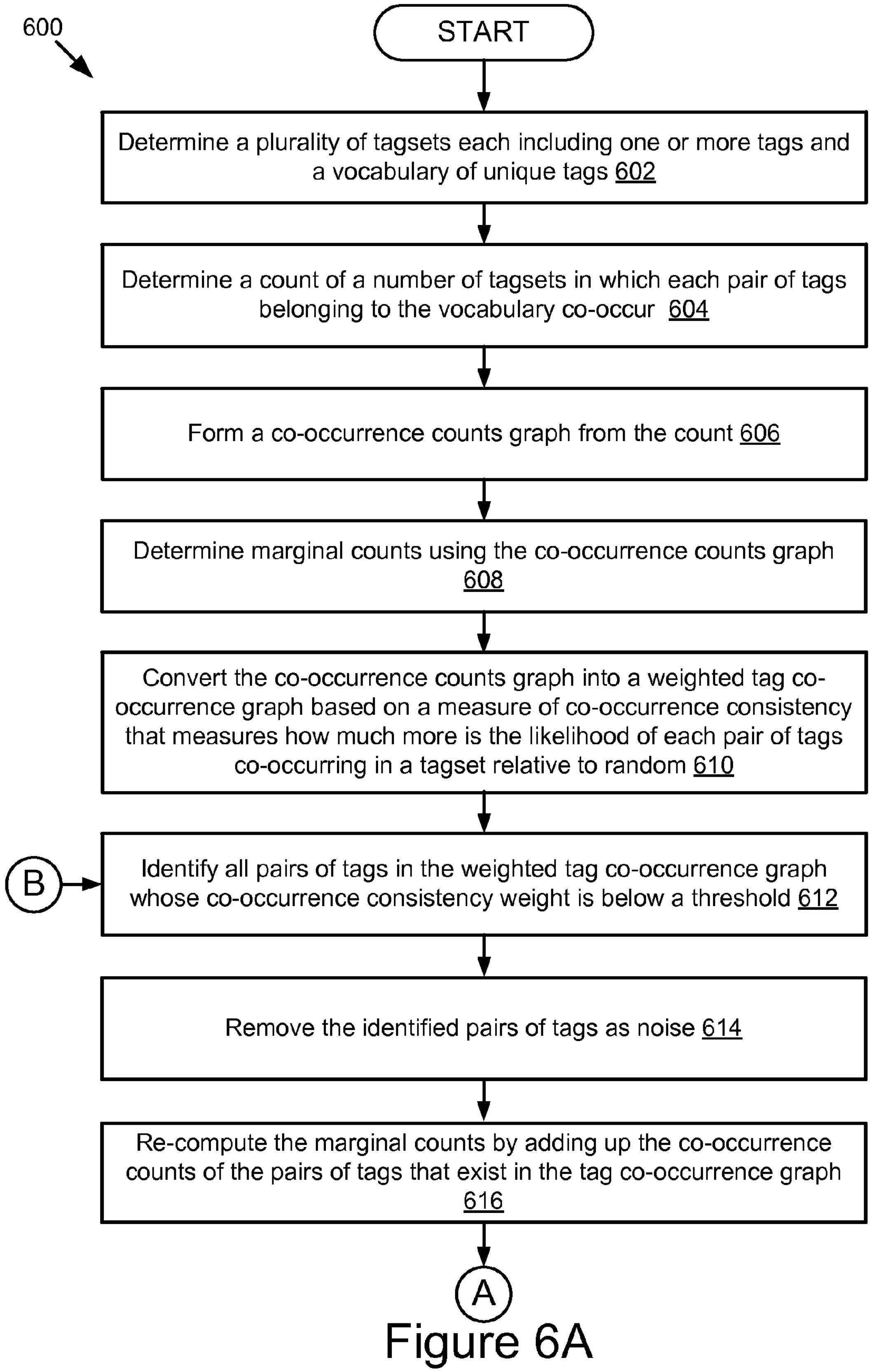
FIGS. 6A and 6B are flowcharts of another example method for removing noise from the weighted tag co-occurrence graph.
Figure 6B:
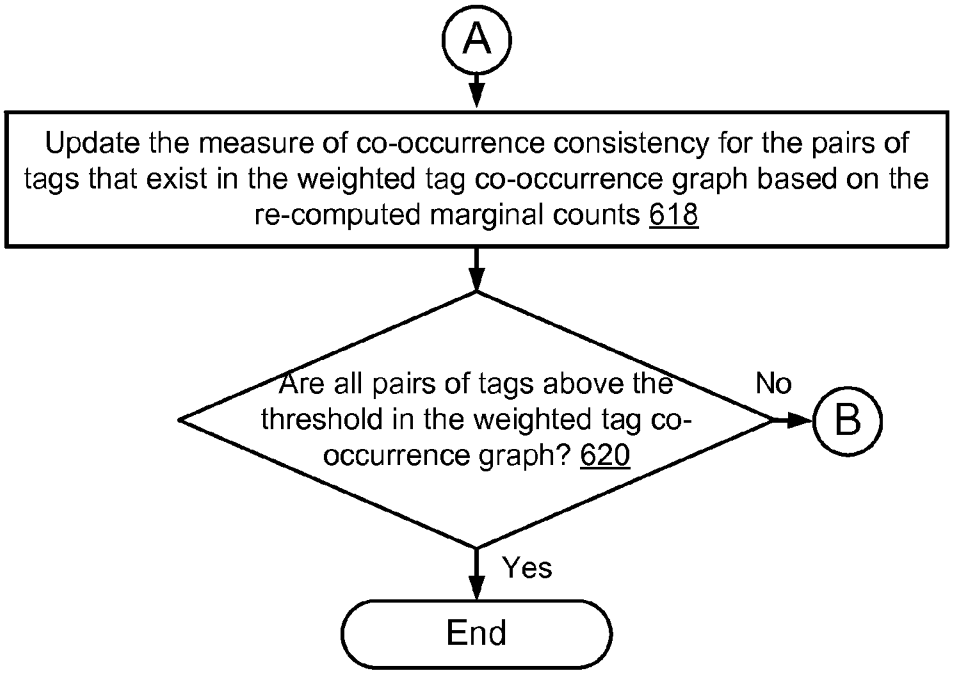

FIGS. 6A and 6B are flowcharts 600 of an example method for removing noise from a weighted tag co-occurrence graph. The community detection module 103 includes a tagset data aggregator 203, a counts statistics engine 205 and a weighted graph generator 207. The tagset data aggregator 203 determines 602 a plurality of tagsets each including one or more tags and a vocabulary of unique tags. The tags include keywords or terms describing an entity. For example, a video sharing online service receives tags, such as "football", "super bowl", "touchdown", "field goal", etc. for a video clip. The counts statistics engine 205 determines 604 a count of a number of tagsets in which each pair of tags belonging to the vocabulary co-occur. The counts statistics engine 205 forms 606 a co-occurrence counts graph from the count and determines 608 marginal counts using the co-occurrence counts graph. The weighted graph generator 207 converts 610 the co-occurrence counts graph into a weighted tag co-occurrence graph based on a measure of co-occurrence consistency that measures how much more is the likelihood of each pair of tags co-occurring in a tagset relative to random. The weighted co-occurrence graph uses the measure of co-occurrence consistency to discard co-occurrence counts between noisy pairs and to keep the co-occurrence counts between signal pairs. The weighted graph generator 207 identifies 612 all pairs of tags in the weighted tag co-occurrence graph whose co-occurrence consistency weight is below a threshold and removes 614 the identified pairs of tags as noise. Then, the weighted graph generator 207 proceeds to re-compute 616 the marginal counts by adding up the co-occurrence counts of the pairs of tags that exist in the tag co-occurrence graph and update 618 the measure of co-occurrence consistency for the pairs of tags that exist in the weighted tag co-occurrence graph based on the re-computed marginal counts. The weighted graph generator 207 determines 620 whether all the pairs of tags in the weighted tag co-occurrence graph are above the threshold. If not all the pairs of tags are above the threshold, the weighted graph generator 207 proceeds to repeat the process from step 612. The weighted graph generator 207 ends the process when all the pairs of tags (i.e., edges) in the weighted tag co-occurrence graph are determined to be above the "$\theta_{consy}$".

Figure 7A:
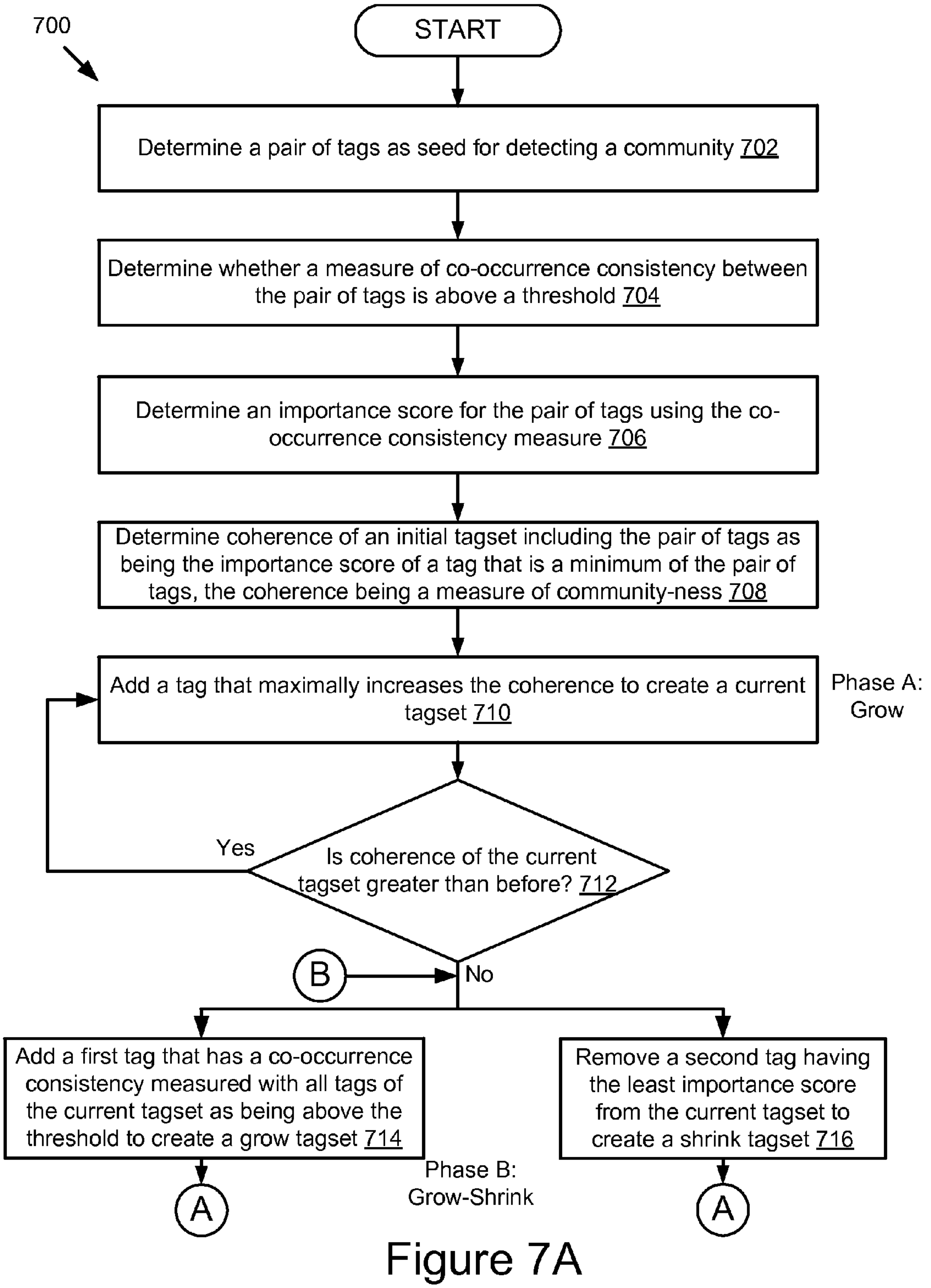
FIGS. 7A and 7B are flowcharts of an example method for detecting a community in a weighted tag co-occurrence graph.
Figure 7B:
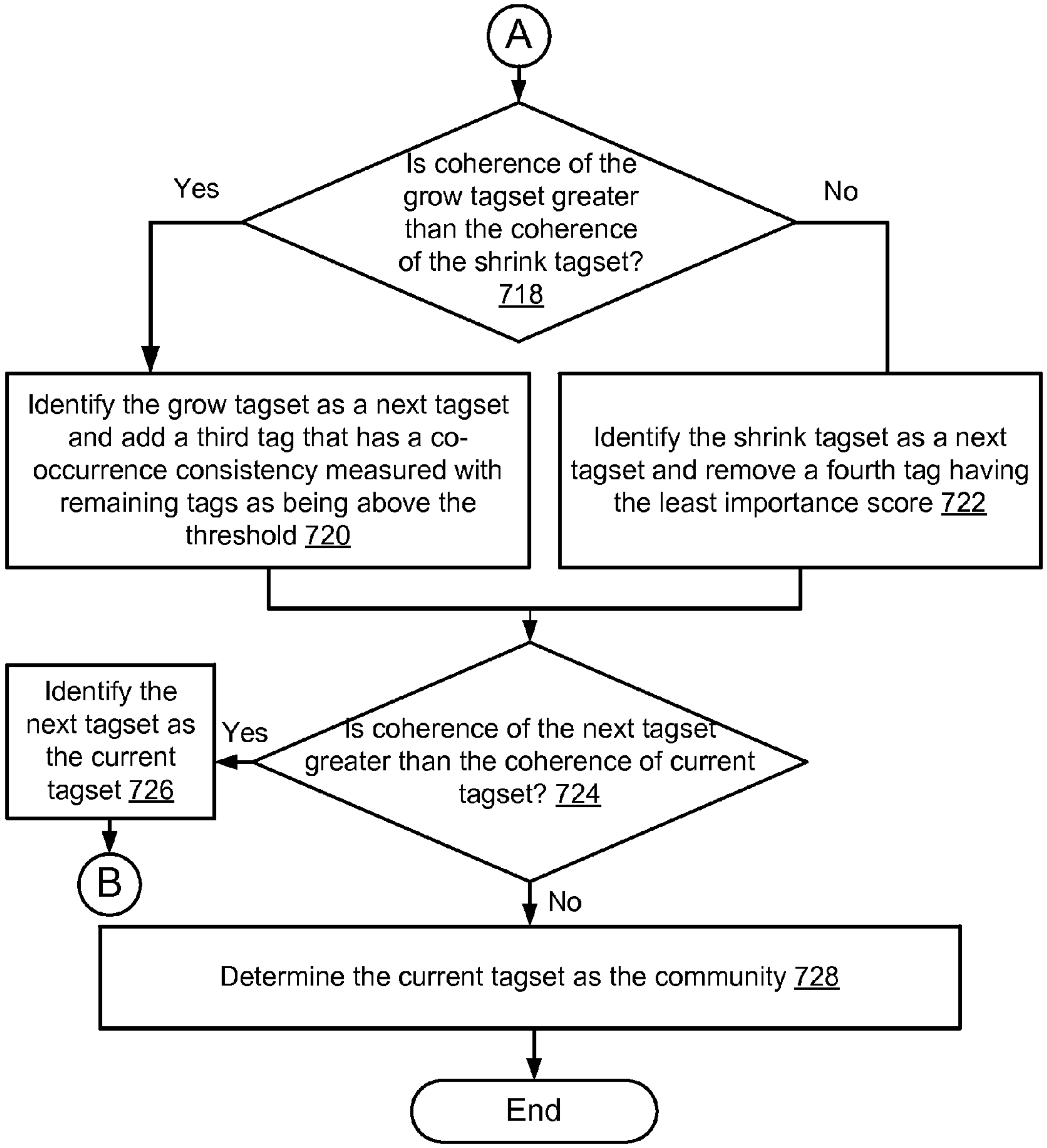

FIGS. 7A and 7B are flowcharts 700 of an example method for detecting a community in a weighted tag co-occurrence graph. The community detection module 103 includes a coherence engine 209 and a community detector 211. The community detector 211 determines 702 a pair of tags as seed for detecting a community and determines 704 whether a measure of co-occurrence consistency between the pair of tags is above a threshold. The threshold is a co-occurrence consistency threshold "$\theta_{consy}$". The coherence engine 209 determines 706 an importance score for each pair of tags using the co-occurrence consistency measure and determines 708 coherence of an initial tagset including the pair of tags as being the importance score of a tag that is an aggregate of the pair of tags. The coherence is a measure of community-ness. The least important tag in the tagset bounds the coherence of the tagset. For example, consider the example tagset {wimbeldon: 1.02, lawn: 0.98, tennis: 0.95, net: 0.88, court: 0.83, watching: 0.83, players: 0.81} including importance scores for each tag. The coherence score determined for this example tagset is 0.81 which is the importance score of the tag "players". The community detector 211 adds 710 a tag that maximally increases the coherence to create a current tagset. The community detector 211 determines 712 whether the coherence of the current tagset is greater than before. If the coherence of the current tagset is greater than before, the community detector 211 repeats the step 710. The community detector 211 generates the largest possible candidate seed from the original seed. If the coherence of the current tagset is not greater than before, the community detector 211 branches to step 714 and step 716. The community detector 211 adds 714 a first tag that has a co-occurrence consistency measured with all tags of the current tagset as being above the threshold to create a grow tagset and removes 716 a second tag having the least importance score from the current tagset to create a shrink tagset. The grow tagset and the shrink tagset are two maximally coherent communities. The community detector 211 determines 718 whether the coherence of the grow tagset is greater than the coherence of the shrink tagset. If the coherence of the grow tagset is greater than the coherence of the shrink tagset, the community detector 211 identifies 720 the grow tagset as a next tagset and adds a third tag that has a co-occurrence consistency measured above the threshold and proceeds to step 624. If the coherence of the grow tagset is not greater than the coherence of the shrink tagset, the community detector 211 identifies 722 the shrink tagset as a next tagset and removes a fourth tag having the least importance score and proceeds to step 624. The community detector 211 determines 724 whether the coherence of the next tagset is greater than the coherence of the current tagset. If the coherence of the next tagset is greater than the coherence of the current tagset, the community detector 211 identifies 726 the next tagset as the current tagset and branches to step 714 and step 716 to repeat. If the coherence of the next tagset is not greater than the coherence of the current tagset, the community detector 211 determines 728 as the current tagset as the community.

Figure 8A:
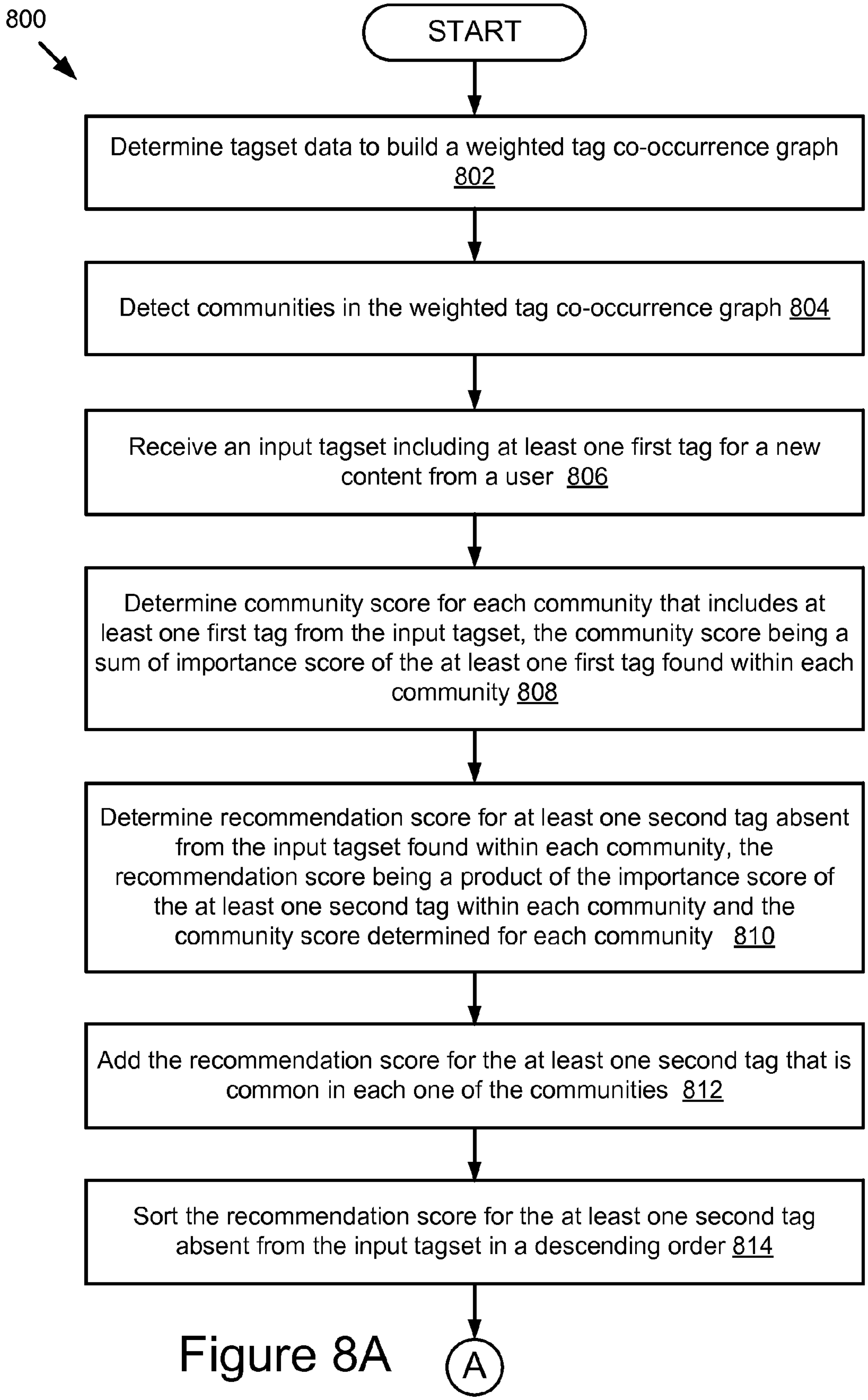
FIGS. 8A and 8B are flowcharts of an example method for recommending tags using the communities.
Figure 8B:
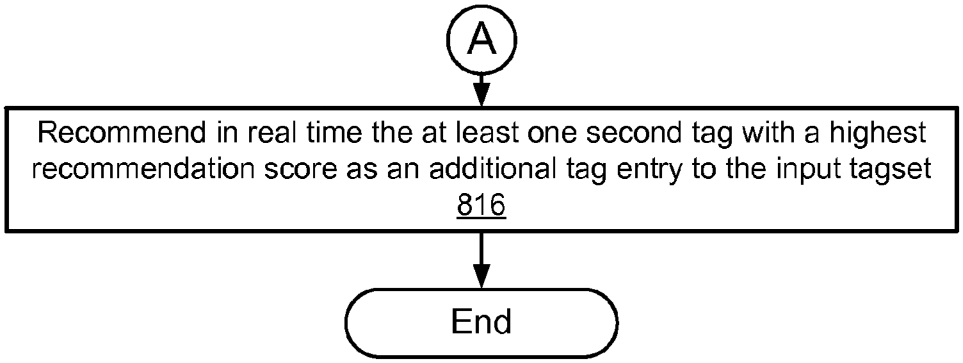

FIGS. 8A and 8B are flowcharts 800 of an example method for recommending tags using the communities. The community detection module 103 includes a weighted graph generator 207, a community detector 211 and a tag recommendation engine 213. The weighted graph generator 207 determines 802 tagset data to build a weighted tag co-occurrence graph. The community detector 211 detects 804 communities in the weighted tag co-occurrence graph. The tag recommendation engine 213 receives 806 an input tagset including at least one first tag for new content from a user. For example, a user inputs a tagset {"snowboard", "frontside", "railslide"} describing a snowboarding video. The tag recommendation engine 213 determines 808 a community score for each community that includes at least one first tag from the input tagset, the community score being a sum of importance scores of the at least one first tag found within each community. The tag recommendation engine 213 determines 810 a recommendation score for at least one second tag absent from the input tagset found within each community, the recommendation score being a product of the importance score of the at least one second tag within each community and the community score determined for each community. The tag recommendation engine 213 adds 812 the recommendation score for the at least one second tag that is common in each one of the communities and sorts 814 the recommendation score for the at least one second tag absent from the input tagset in a descending order. The tag recommendation engine 213 recommends 816 in real time the at least one second tag with a highest recommendation score as an additional tag entry to the input tagset. For example, the tag recommendation engine 213 determines the tags {"superpipe", "720"} as having high recommendation scores. The tag recommendation engine 213 then recommends the tags as additional entries to the input tagset {"snowboard", "frontside", "railslide"} for the snowboarding video in real time.

In the above description, for purposes of explanation, numerous specific details are set forth in order to provide a thorough understanding of the specification. It will be apparent, however, to one skilled in the art that the specification can be practiced without these specific details. In other embodiments, structures and devices are shown in block diagram form in order to avoid obscuring the description. For example, the present implementation is described in some implementations above primarily with reference to user interfaces and particular hardware. However, the present implementation applies to any type of computing device that can receive data and commands, and any peripheral devices providing services.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired item. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms for example “processing” or “computing” or “calculating” or “determining” or “displaying” or the like, refer to the action and processes of a computer system, or similar electronic computing device, that manipulates and transforms data represented as physical (electronic) quantities within the computer system’s registers and memories into other data similarly represented as physical quantities within the computer system memories or registers or other such information storage, transmission or display devices.

The present implementation of the specification also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware implementation, an entirely software implementation or an implementation including both hardware and software elements. In a preferred implementation, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can include, store, communicate, propagate, or transport the program for use by or in connection with the instruction execution system, apparatus, or device.

A data processing system suitable for one or more storing and executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have one or more different names, divisions and formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:

identifying, using one or more computing devices, a context;

determining, using the one or more computing devices, a plurality of tagsets each including one or more tags describing an entity and a vocabulary of unique tags defined by the identified context;

generating, using the one or more computing devices, counts statistics using the plurality of tagsets and the vocabulary of unique tags;

determining a measure of co-occurrence consistent for a pair of tags in the vocabulary of unique tags based on the counts statistics, the measure of co-occurrence consistent indicating a likelihood of the pair of tags co-occurring in a tagset from the plurality of tagsets relative to random;

generating, using the one or more computing devices, a weighted tag co-occurrence graph including the pair of tags in the vocabulary of unique tags based on the measure of co-occurrence consistent;

denoising, using the one or more computing devices, the weighted tag co-occurrence graph; and responsive to removing the noise, identifying, using the one or more computing devices, at least one community in the weighted tag co-occurrence graph.

2. The method of claim 1, further comprising recommending tags in real time based on the at least one community in the weighted tag co-occurrence graph.

3. The method of claim 1, wherein the counts statistics comprise co-occurrence counts for one or more pairs of tags, marginal counts for one or more unique tags, total counts, co-occurrence probabilities and marginal probabilities.

4. The method of claim 1, wherein removing the noise from the weighted tag co-occurrence graph further comprises:

determining whether the measure of co-occurrence consistency for the pair of tags in the weighted tag co-occurrence graph is below a threshold; and responsive to determining that the measure of co-occurrence consistency is below the threshold, removing an edge connecting the pair of tags from the weighted tag co-occurrence graph as noise.

5. The method of claim 1, wherein removing the noise from the weighted tag co-occurrence graph further comprises:

determining whether the measure of co-occurrence consistency for the pair of tags in the weighted tag co-occurrence graph is above a threshold; and responsive to determining that the measure of co-occurrence consistency is above the threshold, re-computing the counts statistics and updating the measure of co-occurrence consistency for the pair of tags in the weighted tag co-occurrence graph based on the recomputed counts statistics.

6. The method of claim 1, wherein identifying the at least one community from the weighted tag co-occurrence graph further comprises:

determining an importance score of the one or more tags in one or more tagsets from the plurality of tagsets using the weighted tag co-occurrence graph, the importance score indicating how highly a tag is connected to other tags in the one or more tagsets;

determining coherence of the one or more tagsets based on the importance score of the one or more tags, the coherence being a measure of community-ness and expressed as an aggregate of the importance score of the one or more tags in the one or more tagsets; and identifying the at least one community from the weighted tag co-occurrence graph by comparing the coherence between the one or more tagsets from the plurality of tagsets.

7. The method of claim 6, wherein identifying the at least one community by comparing the coherence between the one or more tagsets from the plurality of tagsets further comprises:

determining a pair of tags with a measure of co-occurrence consistency above a threshold as seed;

identifying the seed as a current tagset;

determining the coherence of the current tagset;

adding a first tag that has a co-occurrence consistency measured with unique tags of the current tagset above the threshold to create a grow tagset;

removing a second tag having a least importance score from the current tagset to create a shrink tagset;

comparing a coherence measured for the grow tagset with a coherence measured for the shrink tagset;

responsive to the coherence measured for the grow tagset being greater than the coherence measured for the shrink tagset, identifying the grow tagset as a next tagset and adding a third tag that has a co-occurrence consistency measured with remaining tags of the next tagset above the threshold;

responsive to the coherence measured for the grow tagset being lesser than the coherence measured for the shrink tagset, identifying the shrink tagset as the next tagset and removing a fourth tag having a least importance score from the next tagset;

comparing the coherence measured for the next tagset with the coherence of the current tagset; and responsive to the coherence measured for the current tagset being greater than the coherence measured for the next tagset, determining the current tagset as being a community.

8. The method of claim 7, wherein responsive to the coherence measured for the current tagset being lesser than the coherence measured for the next tagset:

adding a first next tag that has a co-occurrence consistency measured with unique tags of the current tagset above the threshold to create a next grow tagset; and removing a second next tag having a least importance score from the current tagset to create a next shrink tagset.

9. The method of claim 7, wherein identifying the seed as the current tagset further comprises:

creating a largest candidate seed by adding a next tag to the seed to increase coherence until failure; and identifying the largest candidate seed as the current tagset.

10. A system comprising:

one or more processors, the one or more processors being configured to:

identify a context;

determine a plurality of tagsets each including one or more tags describing an entity and a vocabulary of unique tags defined by the identified context;

generate counts statistics using the plurality of tagsets and the vocabulary of unique tags;

determine a measure of co-occurrence consistency for a pair of tags in the vocabulary of unique tags based on the counts statistics, the measure of co-occurrence consistency indicating a likelihood of the pair of tags co-occurring in a tagset from the plurality of tagsets relative to random;

generate a weighted tag co-occurrence graph including the pair of tags in the vocabulary of unique tags based on the measure of co-occurrence consistency;

denoise the weighted tag co-occurrence graph; and responsive to removal of the noise, identify at least one community in the weighted tag co-occurrence graph.

11. The system of claim 10, wherein the one or more processors remove the noise from the weighted tag co-occurrence graph by:

determining whether the measure of co-occurrence consistency for the pair of tags in the weighted tag co-occurrence graph is below a threshold; and responsive to determining that the measure of co-concurrency consistency is below the threshold, removing an edge connecting the pair of tags from the weighted tag co-occurrence graph as noise.

12. The system of claim 10, wherein the one or more processors remove the noise from the weighted tag co-occurrence graph by:

determining whether the measure of co-occurrence consistency for the pair of tags in the weighted tag co-occurrence graph is above a threshold; and responsive to determining that the measure of co-occurrence consistency is above the threshold, re-computing the counts statistics and updating the measure of co-occurrence consistency for the pair of tags in the weighted tag co-occurrence graph based on the recomputed counts statistics.

13. The system of claim 10, wherein the one or more processors identify the at least one community from the weighted tag co-occurrence graph by:

determining an importance score of the one or more tags in one or more tagsets from the plurality of tagsets using the weighted tag co-occurrence graph, the importance score indicating how highly a tag is connected to other tags in the one or more tagsets;

determining coherence of the one or more tagsets based on the importance score of the one or more tags, the coherence being a measure of community-ness and expressed as an aggregate of the importance score of the one or more tags in the one or more tagsets; and identifying the at least one community from the weighted tag co-occurrence graph by comparing the coherence between the one or more tagsets from the plurality of tagsets.

14. A computer program product comprising a non-transitory computer usable medium including a computer readable program, wherein the computer readable program when executed on a computer causes the computer to perform steps comprising:

identifying, using one or more computing devices, a context;

determining, using the one or more computing devices, a plurality of tagsets each including one or more tags describing an entity and a vocabulary of unique tags defined by the identified context;

generating, using the one or more computing devices, counts statistics using the plurality of tagsets and the vocabulary of unique tags;

determining a measure of co-occurrence consistency for a pair of tags in the vocabulary of unique tags based on the counts statistics, the measure of co-occurrence consistency indicating a likelihood of the pair of tags co-occurring in a tagset from the plurality of tagsets relative to random;

generating, using the one or more computing devices, a weighted tag co-occurrence graph including the pair of tags in the vocabulary of unique tags based on the measure of co-occurrence consistency;

denoising, using the one or more computing devices, the weighted tag co-occurrence graph; and responsive to removing the noise, identifying, using the one or more computing devices, at least one community in the weighted tag co-occurrence graph.

15. The computer program product of claim 14, wherein removing the noise from the weighted tag co-occurrence graph further comprises:

determining whether the measure of co-occurrence consistency for the pair of tags in the weighted tag co-occurrence graph is below a threshold; and responsive to determining that the measure of co-occurrence consistency is below the threshold, removing an edge connecting the pair of tags from the weighted tag co-occurrence graph as noise.

16. The computer program product of claim 14, wherein removing the noise from the weighted tag co-occurrence graph further comprises:

determining whether the measure of co-occurrence consistency for the pair of tags in the weighted tag co-occurrence graph is above a threshold; and responsive to determining that the measure of co-occurrence consistency is above the threshold, re-computing the counts statistics and updating the measure of co-occurrence consistency for the pair of tags in the weighted tag co-occurrence graph based on the recomputed counts statistics.

17. The computer program product of claim 14, wherein identifying the at least one community from the weighted tag co-occurrence graph further comprises:

determining an importance score of the one or more tags in one or more tagsets from the plurality of tagsets using the weighted tag co-occurrence graph, the importance score indicating how highly a tag is connected to other tags in the one or more tagsets;

determining coherence of the one or more tagsets based on the importance score of the one or more tags, the coherence being a measure of community-ness and expressed as an aggregate of the importance score of the one or more tags in the one or more tagsets; and identifying the at least one community from the weighted tag co-occurrence graph by comparing the coherence between the one or more tagsets from the plurality of tagsets.

* * * * *